US006914553B1

(12) United States Patent
Beadle et al.

(10) Patent No.: US 6,914,553 B1
(45) Date of Patent: Jul. 5, 2005

(54) SYNTHETIC APERTURE RADAR (SAR) COMPENSATING FOR IONOSPHERIC DISTORTION BASED UPON MEASUREMENT OF THE FARADAY ROTATION, AND ASSOCIATED METHODS

(75) Inventors: Edward R. Beadle, Melbourne, FL (US); Paul D. Anderson, Melbourne, FL (US); Steve Richter, Melbourne Beach, FL (US); John F. Dishman, Melbourne, FL (US); Emile Ganthier, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/984,638

(22) Filed: Nov. 9, 2004

(51) Int. Cl.[7] .............................. G01S 13/90; G01S 7/40
(52) U.S. Cl. ..................... 342/25 R; 342/22; 342/25 A; 342/25 F; 342/89; 342/118; 342/134; 342/159; 342/165; 342/173; 342/175; 342/188; 342/192; 342/195; 342/196; 342/352; 342/358; 244/158 R; 375/340; 375/343
(58) Field of Search ............................. 244/158 R, 159; 342/22, 25 R–25 F, 26 R, 26 A, 27, 28, 73, 89–115, 118, 127–147, 159, 165–175, 188–197, 352, 358, 361–366; 375/130–153, 316, 340–343

(56) References Cited

U.S. PATENT DOCUMENTS

| 4,060,808 A | * | 11/1977 | Foldes ......................... 342/352 |
| 4,463,357 A | | 7/1984 | MacDoran .................. 343/460 |
| 4,785,302 A | * | 11/1988 | Ma et al. ..................... 342/362 |
| 4,924,229 A | | 5/1990 | Eichel et al. ................. 342/25 |
| 5,068,668 A | * | 11/1991 | Tsuda et al. ................. 342/362 |
| 5,160,932 A | * | 11/1992 | Bull ........................... 342/25 R |
| 5,313,210 A | | 5/1994 | Gail .............................. 342/25 |
| 5,809,064 A | | 9/1998 | Fenton et al. ................ 375/208 |
| 5,903,654 A | | 5/1999 | Milton et al. ................. 380/49 |
| 5,905,456 A | | 5/1999 | Didier ........................... 342/25 |
| 6,208,295 B1 | * | 3/2001 | Dogan et al. ................ 342/362 |
| 6,359,584 B1 | | 3/2002 | Cordey et al. ............. 342/169 |
| 6,603,424 B1 | * | 8/2003 | Abatzoglou ............... 342/25 R |
| 6,618,002 B1 | * | 9/2003 | Perry ......................... 342/107 |

OTHER PUBLICATIONS

Fitzgerald, Ionospheric Effects on Synthetic Aperture Radar at VHF, Los Alamos National Laboratory, 1997, pp. 237–239.

Liu et al., Ionospheric Effects on SAR Imaging: A Numerical Study, IEEE Transactions on Geoscience and Remote Sensing, vol. 41, No. 5, May 2003, pp. 939–947.

Gail, Effect of Faraday Rotation on Polarmetric SAR, IEEE Transactions on Aerospace and Electronic Systems, vol. 34, No. 1, Jan. 1998, pp. 301–308.

Kim, Ionospheric Effects on Polarimetric and Interferometric Space–borne SAR, 1998, pp. 472–474.

* cited by examiner

Primary Examiner—Bernarr E. Gregory
(74) Attorney, Agent, or Firm—Allen, Dyer, Doppelt, Milbrath & Gilchrist, P.A.

(57) ABSTRACT

A synthetic aperture radar (SAR) for a moveable platform includes an antenna, a radar transmitter and radar receiver cooperating with the antenna. A radar processor is connected to the radar transmitter and radar receiver to account for the Faraday rotation introduced by propagation through the ionosphere by estimating an individual ionospheric distortion for each received echo pulse based upon a measured Faraday rotation, and reducing the ionospheric distortion for each received echo pulse based upon the estimated individual ionospheric distortion associated therewith for providing a compensated echo pulse.

44 Claims, 12 Drawing Sheets

SYNTHETIC APERTURE RADAR (SAR) COMPENSATING FOR IONOSPHERIC DISTORTION BASED UPON MEASUREMENT OF THE FARADAY ROTATION, AND ASSOCIATED METHODS

GOVERNMENT LICENSE RIGHTS

The U.S. Government has a paid-up license in this invention and the right in limited circumstances to require the patent owner to license others on reasonable terms as provided for by the terms of contract No. 03-C-0024, awarded by the U.S. Government.

FIELD OF THE INVENTION

The present invention relates to the field of radar, and more particularly, to a synthetic aperture radar (SAR).

BACKGROUND OF THE INVENTION

A synthetic aperture radar (SAR) is a moving platform radar mapping technique for generating high resolution images of terrain or targets by taking advantage of the platform's relative velocity with respect to the ground below. SAR imaging techniques are used in both aircraft based and space-based systems. In SAR imaging, the ground is illuminated by transmit pulses that are plane polarized, and the echo pulses scattered back towards the receiver carries information about the nature of the features illuminated. The information available to the receiving system is carried in two orthogonal polarization states (e.g., horizontal and vertical).

There is current interest in space-based foliage penetration SARs to extend the utility of this remote sensing technique. Because of their longer wavelengths, low frequency SARs (VHF/UHF band) provide enhanced foliage and ground penetration capabilities as compared to high frequency SARs (L-band and above). However, to date the development and performance of low frequency SARs has been severely limited by the distortion of the RADAR waveform by the ionosphere. This is why low frequency SAR systems generally are operated from aircraft flying below the ionosphere, whereas space-based SARs typically use higher frequencies because ionospheric distortion is generally negligible at shorter wavelengths.

The ionosphere is defined to be the region of the upper atmosphere that includes large quantities of charged particles, such as electrons. The electron density is measured by a quantity termed the total electron content (TEC). In the presence of a magnetic field such as the earth's, the TEC of the ionosphere exhibits a spatially varying value. As a function of the TEC, an information bearing signal (i.e., a RADAR waveform) is both dispersed and rotated as it propagates on a trans-ionospheric path. The dispersion and rotation vary across the spatial expanse that defines a typical synthetic aperture. Variations in the TEC experienced by a low frequency SAR operating in or through the ionosphere result from many variables, including location (i.e., latitude/longitude), diurnal/seasonal variations and solar activity. Even mild ionospheric conditions (e.g., 2 TEC units with a 5% variation) may result in blurring of up to hundreds of meters in the SAR image, in both range and cross-range.

Two important effects of the ionosphere on polarized transmitted pulses and associated echo pulses in the VHF/UHF band can be described in terms of non-constant group delay and Faraday rotation. Non-constant group delay manifests itself as a time-domain pulse spreading and shape distortion due to the non-linear phase characteristic imposed by the ionosphere.

For instance, two-way group delays of the ionosphere in the 200 to 400 MHz frequency band are illustrated in FIG. 1a. Lines 20, 22, 24, 26 and 28 respectively correspond to TEC units of 1, 10, 20, 40 and 60. As the electron density increases, the group delay for a given frequency increases. The corresponding pulse spreading is illustrated in FIG. 1b, wherein lines 30, 32, 34, 36 and 38 respectively correspond to the same TEC units of 1, 10, 20, 40 and 60. Likewise, as the electron density increases, the pulse spreading increases.

Faraday rotation in the ionosphere causes the polarization of transmitted pulses to undergo a rotation. Because of the unknown TEC on the ionospheric path, this rotation is initially unknown, and therefore it is difficult to predict what polarization the pulses will have when they strike an object being imaged. Incident polarization control is a necessary feature for a special class of SARs known as fully polarimetric. The Faraday rotation induced by the ionosphere, if left uncompensated, renders this mode unavailable to low frequency space-based SARs. Further, the illuminated object can induce a polarization rotation of its own. Then on the return path the ionosphere again places an initially unknown rotation on the echo pulses. The polarization shift induced by the illuminated object is actually information that should be preserved for a fully polarimetric SAR. Even for traditional (non-polarimetric) SAR applications, it is of great interest for polarization states induced by the propagation medium to be known at the radar transmitter/receiver so the data can be properly processed and interpreted by end users, such as image analysts.

Ionospheric rotation angles versus frequency in the 200 to 400 MHz frequency band are illustrated in FIG. 2. Lines 40, 42, 44, 46, 48, 50 and 52 respectively correspond to TEC units of 1, 4, 10, 20, 40, 60 and 100. As the electron density increases, the Faraday rotation angle increases. At a frequency of 200 MHz, the Faraday rotation causes phase ambiguities (i.e., more than 360-degree rotations) for electron densities greater than 20 TEC units. Even when the rotation is too small to generate a phase ambiguity, it may significantly impact both the incident and reflected field at each scatterer in the scene.

The ionospheric effects of non-linear group delay and Faraday rotation may be compensated using a number of known techniques including predictive techniques, data adaptive techniques and scene aided techniques. Predictive techniques use measurements of space weather, GPS frequency shifts, and UV imaging. For example, signals from Global Positioning System (GPS) satellites can be used to measure current ionospheric distortions in particular locations. These measurements can be used to predict ionospheric conditions throughout the world, and these predictions can then be broadcast world-wide. The quality of the prediction is generally insufficient for purposes of a spaced-based SAR, because it is very difficult to obtain measurements with sufficient temporal and spatial proximity to the SAR platform. Other techniques for direct ionospheric measurement exist (i.e., ionosondes), but all are plagued by the same limitations as the GPS method.

Common data adaptive techniques include phase gradient autofocus, inverse filtering and map drift. Here, the ionospheric distortion is measured or estimated based upon the collected data itself. The correction adapts to the specific conditions prevailing on the collection, and primarily deals with systematic errors that are constant across the entire collection. Systematic errors include a fixed timing offset or a mispointed antenna, for example. Since the ionosphere is not homogeneous, the distortion varies with location since the SAR platform is moving. These known data adaptive techniques do not adequately compensate for the spatially varying ionospheric distortion on the transmit pulses and associated echo pulses.

Scene-aided techniques involve receiving signals from artificial (i.e., man-made), ground-based calibration devices with known scattering or transmission properties. Accuracy is limited by the precision with which the ground-based calibrators can be built, maintained and oriented. Scene-aided techniques are constrained from a practical standpoint by the need to locate the calibrators in areas where the calibrators can be clearly detected, which may be difficult in certain areas of interest.

A calibration technique for removing Faraday rotation effects in SAR imagery is disclosed in an article by William Gail titled "Effect Of Faraday Rotation On Polarimetric SAR," IEEE Transactions on Aerospace and Electronic Systems, Vol. 34, No., 1, January 1998. Gail assumes a single rotation angle to calibrate an entire image, and then evaluates the impact of deviations from this value on the range and azimuth impulse responses. Since the ionosphere is not homogeneous and the distortion is spatially varying, assuming a single rotation angle for an entire image is generally not sufficient for high resolution imaging. Moreover, the article does not address the non-linear phase response of the ionosphere causing time domain distortions.

SUMMARY OF THE INVENTION

In view of the foregoing background, it is therefore an object of the present invention to provide a synthetic aperture radar (SAR) that compensates for ionospheric distortions based upon measurement of the Faraday rotation, particularly when operating in the VHF/UHF band.

This and other objects, features, and advantages in accordance with the present invention are provided by a SAR for a moveable platform comprising at least one antenna moveable with the platform and directed through the ionosphere, a radar transmitter, a radar receiver and a radar processor. The radar transmitter and radar receiver preferably operate in the VHF/UHF band, and the moveable platform is preferably a satellite orbiting the earth in or above the ionosphere.

The radar transmitter cooperates with the antenna to propagate transmit pulses through the ionosphere, and subjects the transmit pulses to a Faraday rotation based upon propagation through the ionosphere along a transmit path. The radar receiver cooperates with the antenna to receive echo pulses through the ionosphere based upon the transmit pulses, and subjects the echo pulses to a Faraday rotation based upon propagation through the ionosphere along a receive path.

The radar processor is connected to the radar transmitter and radar receiver for processing to account for the Faraday rotation introduced by propagation through the ionosphere. The radar processor estimates an individual ionospheric distortion for each received echo pulse based upon a measured Faraday rotation, and reduces the ionospheric distortion for each received echo pulse based upon the estimated individual ionospheric distortion associated therewith for providing a compensated echo pulse.

The radar transmitter may adjust transmission of at least one subsequent transmit pulse based upon the measured Faraday rotation. Likewise, the radar receiver may adjust processing of the echo pulse associated with the at least one subsequent transmit pulse based upon the measured Faraday rotation. The radar processor advantageously accounts for the Faraday rotation on a per pulse basis.

The radar transmitter may generate the transmit pulses so that each transmit pulse comprises a modulated signal having a predetermined bandwidth. The radar processor estimates the Faraday rotation for a plurality of frequencies within the predetermined bandwidth for the echo pulse associated with the at least one given transmit pulse. The modulated signal may comprise a linear frequency modulated chirp signal.

The radar processor measures the Faraday rotation based upon cross-polarization and co-polarization measurements for the echo pulse associated with at least one given transmit pulse based upon the following polarimetric equation $$\frac{V_{HV}(f) - V_{VH}(f)}{V_{HH}(f) + V_{VV}(f)},$$

where $V_{HH}$ represents measurement of a co-polarized horizontal backscatter echo signal, $V_{VV}$ represents measurement of a co-polarized vertical backscatter echo signal, and $V_{VH}$ and $V_{HV}$ represent measurements of corresponding cross-polarized backscatter echo signals.

The polarimetric equation may be equal to tan $(2\Omega(f))$, and $$\Omega(f) = \alpha \frac{TEC}{f^2},$$

where $\Omega(f)$ is equal to the measured Faraday rotation at frequency f for the echo pulse associated with the at least one given transmit pulse, $\alpha$ is equal to a fixed constant, and TEC is a total electron content of the ionosphere for frequency f of the echo pulse associated with the at least one given transmit pulse. The radar processor derives from $\Omega(f)$ at multiple frequencies the TEC for the echo pulse associated with the at least one given transmit pulse.

The radar transmitter may generate the transmit pulses so that each transmit pulse comprises a modulated signal having a predetermined bandwidth, and the radar processor may measure the Faraday rotation for a plurality of frequencies within the predetermined bandwidth for the echo pulse associated with the at least one given transmit pulse. The radar processor may compensate for errors in the measured Faraday rotation by determining a plurality of sine values for the plurality of measured Faraday rotations within the echo pulse; determining a Fourier transform for the plurality of sine values; and selecting a peak value from the Fourier transform, with a position of the peak value corresponding to a compensated Faraday rotation.

Alternatively, the radar processor may measure the Faraday rotation for a plurality of frequencies within the predetermined bandwidth for the echo pulse associated with the at least one given transmit pulse; and the radar processor compensates for errors in the measured Faraday rotation by averaging the TEC at multiple frequency pairings within the echo pulse.

If the measured Faraday rotation is less than or equal to 10 degrees, for example, then a compensated Faraday rotation is produced by taking the following average for a plurality of frequencies with the echo pulse:

$$\text{mean}_{all\ f}\left[\left(\frac{V_{HV}(f) - V_{VH}(f)}{V_{HH}(f) + V_{VV}(f)}\right)\frac{f^2}{2\alpha}\right] = TEC_{est}.$$

The ionosphere has a spatially varying total electron content (TEC) associated therewith. The radar processor may derive from the measured Faraday rotation the TEC for the echo pulse associated with the at least one given transmit pulse, and may update the measured Faraday rotation based upon the derived TEC. The measured Faraday rotation for the transmit path is assumed to be equal to the Faraday rotation for the receive path.

Another aspect of the present invention is to a satellite comprising a housing moveable in space with respect to earth, and a SAR as defined above carried by the housing.

Yet another aspect of the present invention is directed to a method for operating a SAR for a moveable platform comprising directing at least one antenna through the ionosphere, and transmitting transmit pulses from a radar transmitter cooperating with the one antenna, and subjecting the transmit pulses to a Faraday rotation based upon propagation through the ionosphere along a transmit path.

The method further comprises receiving echo pulses associated with the transmit pulses by a radar receiver cooperating with the at least one antenna, and subjecting the echo pulses to a Faraday rotation based upon propagation through the ionosphere along a receive path. Processing is performed to account for the Faraday rotation introduced by propagation through the ionosphere.

The processing comprises estimating an individual ionospheric distortion for each received echo pulse based upon a measured Faraday rotation, and reduces the ionospheric distortion for each received echo pulse based upon the estimated individual ionospheric distortion associated therewith for providing a compensated echo pulse.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

A multi-input and multi-output (MIMO) adaptive equalization technique for compensating ionospheric distortion imparted on signals used by a synthetic aperture radar (SAR) operating in the VHF/UHF band are discussed in detail below. The MIMO technique estimates the effective ionospheric conditions via observation of the varying group delay induced by the ionosphere, in multiple sub-bands of the operating frequency region. Estimates of the effective ionospheric conditions in accordance with the present invention do not rely upon any a priori knowledge of scene content or channel conditions. Even though the following discussion is based upon a SAR operating in the VHF/UHF band, the techniques in accordance with the present invention for estimating the effective ionospheric conditions are applicable to frequencies other than the VHF/UHF band, which may also be affected by the ionosphere.

Figure 3:
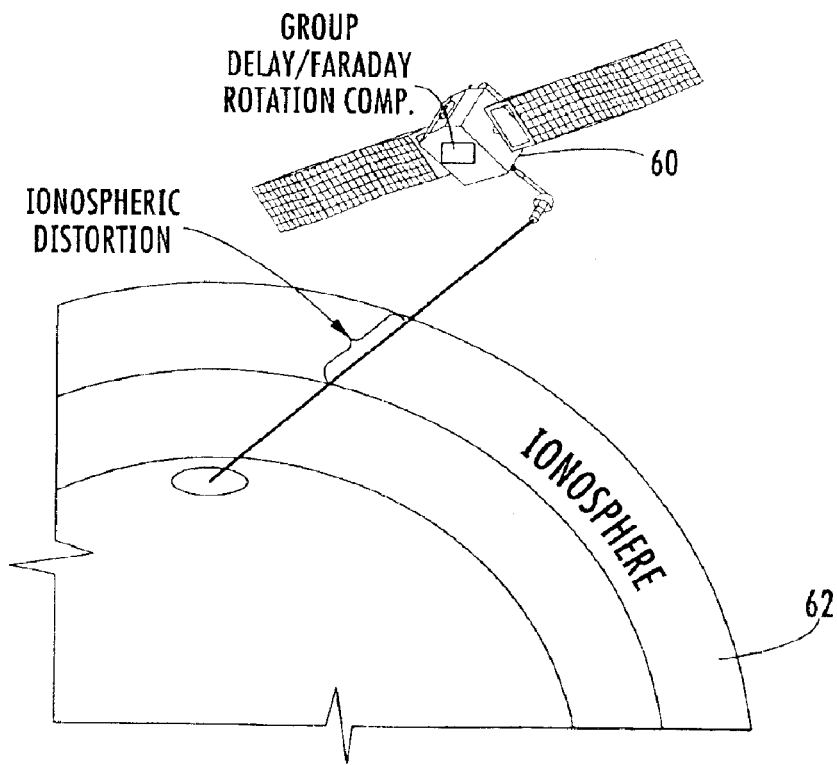
FIG. 3 is a perspective view of a space-borne SAR operating in the VHF/UHF band in accordance with the present invention.

Referring now to FIG. 3, operating a space-borne SAR 60 in the VHF/UHF band is very difficult because of the inhomogeneous, anisotropic nature of the ionosphere 62. For SAR applications, the primary difficulty is that the transmit pulses are subjected to a spatially varying ionospheric distortion along a transmit path, and the corresponding echo pulses are also subjected to spatially varying ionospheric distortion along a receive path. As discussed in the background section, the ionosphere has a spatially varying total electron content (TEC), so the ionospheric distortion varies over the course of any collect and cannot be represented by a common value for all pulses in a collect from which high resolution images are to be generated. As will be discussed in greater detail below, the illustrated SAR 60 is configured for compensating for ionospheric distortions based upon measurement of the group delay or measurement of the Faraday rotation.

The TEC variation can be significant depending upon a number of conditions, but an assumption is made that the variation occurs slowly enough that it can be neglected during the time period associated with a single pulse repetition interval (PRI). For any given location in the ionosphere, temporal variations generally occur over time periods that are long with respect to a PRI. The spatial variation along the synthetic aperture is orders of magnitude more significant to imaging problems.

If left uncompensated, even a relatively low ionospheric TEC induces significant distortion of the SAR image, not only from the magnitude of the TEC (i.e., the average TEC level), but especially from these spatial variations of the TEC. The average TEC level tends to blur the response of a point scatterer in the range direction. When variability in the TEC is introduced across the synthetic aperture, the blur occurs in both the range and azimuth directions. Even a 5% variability at a relatively low TEC (e.g., 8 TEC units) has a more detrimental effect than a much higher level of TEC (e.g., 40 TEC units) with no TEC variability.

Relating the problem of ionospheric distortion compensation for VHF/UHF SAR signals to the more traditional problem of equalizing a multi-input and multi-output (MIMO) communication channel will now be discussed. This MIMO dimensionality of the problem arises from the potential polarization diversity of transmit and receive systems on the SAR, and the potential for sub-banding the operating frequency region.

A key difference between compensation of channel effects for communication applications and SAR applications is that typical channel equalization techniques (as used in the communication applications) seek to remove all channel impairments. In contrast, in the SAR applications the scene content forms part of the channel between the transmitter and the receiver, and this content must not be removed by the compensation.

The MIMO technique for estimating the effective ionospheric conditions will be referred to as the group delay (sub-band) approach and the Faraday rotation approach. The group delay approach may be divided into a 1-dimensional (range) approach and a 2-dimensional (range and cross-range) approach, as will be discussed in further detail below. These approaches essentially measure the effective or observed TEC, which can be used to compensate the ionospheric distortion.

Figure 4:
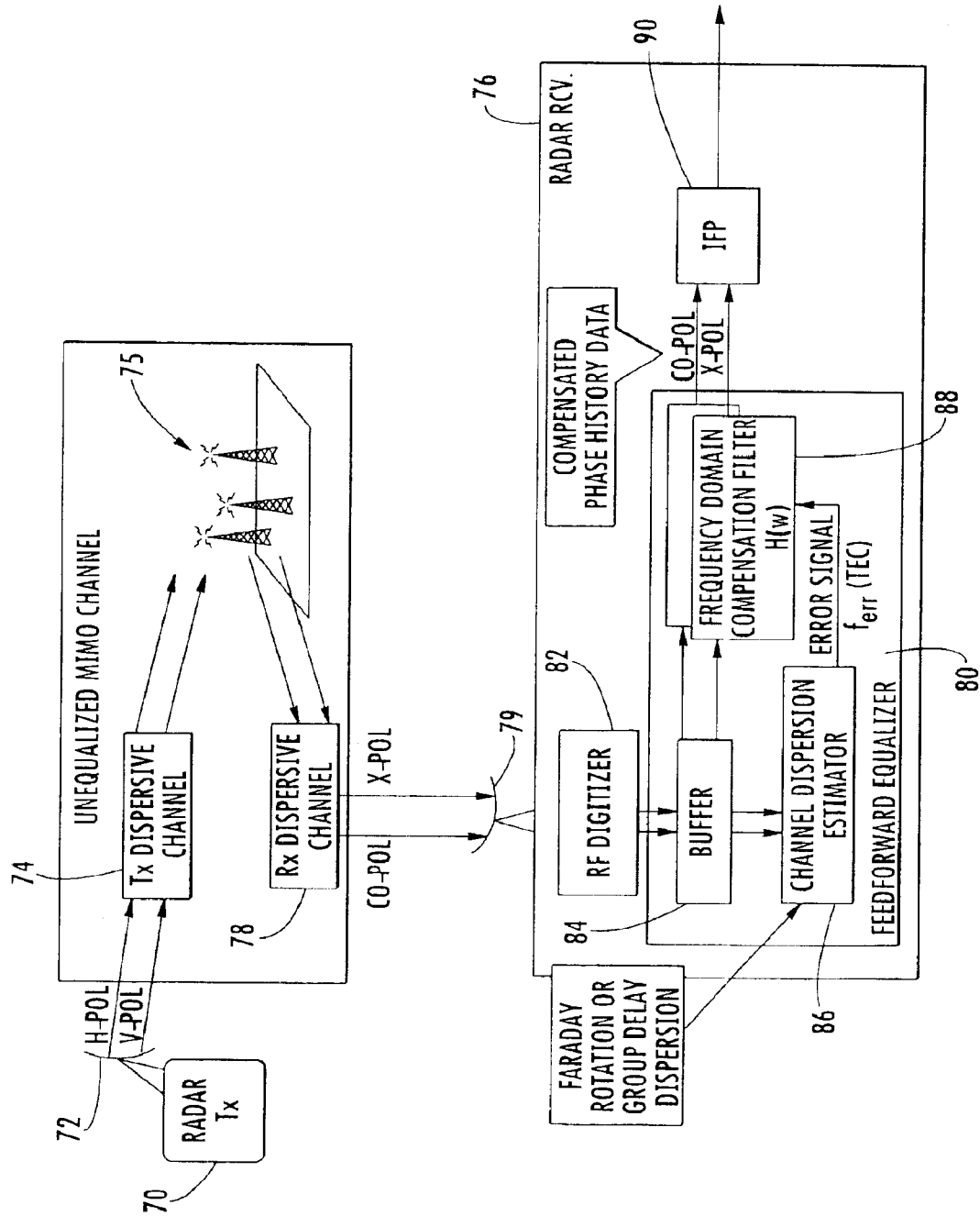
FIG. 4 is a block diagram of a multi-input and multi-output (MIMO) channel and equalization approach for ionospheric distortion in accordance with the present invention.

A multi-input and multi-output (MIMO) channel and equalization approach will now be discussed with reference to FIG. 4. As noted above, typical channel equalization problems seek to remove all the channel impairments between the transmitter and receiver, such as dispersion, frequency selectivity and the like. In communication applications, this is acceptable since multipath is generally to be corrected or eliminated. In the SAR application however, the scene content part of the channel is to remain uncompensated. Otherwise, the image formed may be distorted or completely unusable because the scene content would be compensated out.

Determining the appropriate corrections to leave the scene data intact and remove only the transmit and receive channel effects is a challenge. A radar transmitter 70 cooperates with an antenna 72 to propagate transmit pulses through the ionosphere 62 toward a target or terrain region containing a number of scatterers 75. The ionosphere subjects the transmit pulses to ionospheric distortion based upon propagation through the ionosphere along a transmit path 74. These pulses strike the scatterers 75, producing echo pulses that propagate back through the ionosphere along a receive path 78 to the SAR platform. The ionosphere subjects the echo pulses to additional (potentially different) ionospheric distortion based upon propagation along the receive path 78. A radar receiver 76 cooperates with an antenna 79 to receive the echo pulses from the scatterers 75 through the ionosphere 62. The radar transmitter 70 and radar receiver 76 may be co-located so that they share the same antenna, or they may be separate from one another so that they each have a respective antenna.

The scene's frequency selectivity complicates the problem further. Frequency selectivity arises for two reasons. First, each scatterer's frequency dependent reflectivity induces a fading as the radar waveform is chirped across the band. Second, the scatterer spacing induces speckle, i.e., interference patterns, over the operating band which manifests itself as a fading effect. In the following discussion, both effects are being referred to when addressing the frequency selective multipath.

Additionally, the scene imposes its own polarization response, i.e., the scattering matrix per scatterer. For polarimetric SARs, the scene polarimetric properties must be retained while the Faraday rotation of the transmit and receive paths is removed. The current invention provides, via an estimate of the TEC for each transmitted pulse (or small group of pulses), a method by which the Faraday rotation induced by the ionosphere may be compensated in the radar receiver 76.

An equalizer 80 resides in the radar receiver 76. The illustrated approach digitizes the entire RF bandwidth with an RF digitizer 82. This is possible because typical VHF/UHF systems of interest use bandwidths less than about 300 MHz and center frequencies below 500 MHz. These types of waveforms can be directly digitized with currently available analog-to-digital converters. The co-polarization (co-pol) and the cross-polarization (X-pol) data are digitized for use in the correction system. The co-pol and x-pol are two orthogonal receive polarizations. This polarization diversity is introduced since a convenient receive polarization description may differ from the transmit polarization description due to the Faraday rotation caused by the ionosphere 62 or scattering parameters of the scene content.

After digitization, the RF data is passed to the equalizer 80, which is a feedforward equalizer, and is buffered in a buffer 84. Feedforward equalizers are commonly used in open-loop compensation strategies, as readily appreciated by those skilled in the art. The buffer 84 provides the necessary delay while the error signals are computed. A channel dispersion estimator 86 measures the dispersion in the data. This is done by exploiting either the differential group delay variation or the Faraday rotation angle across sub-bands.

The compensation filter 88 is constructed as an all-pass phase-only filter of an appropriately derived phase function This technique is applied because in the present embodiment it is assumed the ionosphere 62 does not affect the signal amplitude spectrum. However, this technique is extensible in situations where the ionosphere also has frequency selectivity.

The error signal derived in the feedforward equalizer 80 is a measure of the TEC. The TEC drives the necessary compensation provided by the compensation filter 88. The compensation filter 88 is an all-pass phase-only filter, and is used since it is assumed that the ionosphere 62 does not attenuate the signals. The compensated RF data is passed to an image formation processor (IFP) 90 for typical processing to produce an image. The IFP 90 processes the RF data according to its design, i.e., dechirp on receive.

The narrowband limitation typically used for other communication system equalizers was a major factor in reaching this conclusion. Extending this concept to a SAR was not practical as the fine channelization required to implement the frequency domain technique destroyed the ability to use scene content because of resolution issues. Because of this issue and the requirement that the scene content frequency selective multipath be preserved, other approaches that could separate and exploit T/R channel conditions were examined.

The two approaches that were selected to compensate for the ionospheric distortion in the ionosphere 62 for a spaceborne SAR 60 operating in the VHF/UHF band is the group delay variation approach and the Faraday rotation approach. Both approaches essentially produce estimates of the TEC. The TEC is the key element to estimate because it parameterizes the dispersive and rotational nature of the channel, i.e., the transmit and receive paths 74, 78. One design goal is clear in that it is highly desirable to produce a correction per PRI, otherwise an attempt is being made to derive a constant correction for a varying channel.

In the group delay approach, the wideband channel is sub-divided into N bands per receive polarization. An advantage of the banded approach is that a better TEC estimate is achievable by averaging individual TEC estimates from each sub-band. This is because the same TEC is present in all bands, and its effect in each band, i.e., the group delay, is a known relationship. The group delay variations are measured using the scene returns, and only the ionosphere induces group delay effects. However, a high density of scatterers in the scene can corrupt group delay measurement processes, which imposes some limitations on this approach.

In the Faraday rotation approach, channelization is not used because all of the data is used simultaneously to derive the compensation. However, channelization could be included if it was determined to be advantageous. Regardless of which approach is used to estimate the TEC, the compensation method is the same.

The compensation filter 88 is an all-pass phase only filter and can be implemented a number of ways. Some ways include processing solely in the frequency domain or converting the filter transfer function into an FIR (transversal) filter structure. The former option is supported by the banding of the input. Since the data is available in bands after the compensation calculations, the compensation can be performed in parallel. This is typically not a feature of transversal filters.

Figure 5:
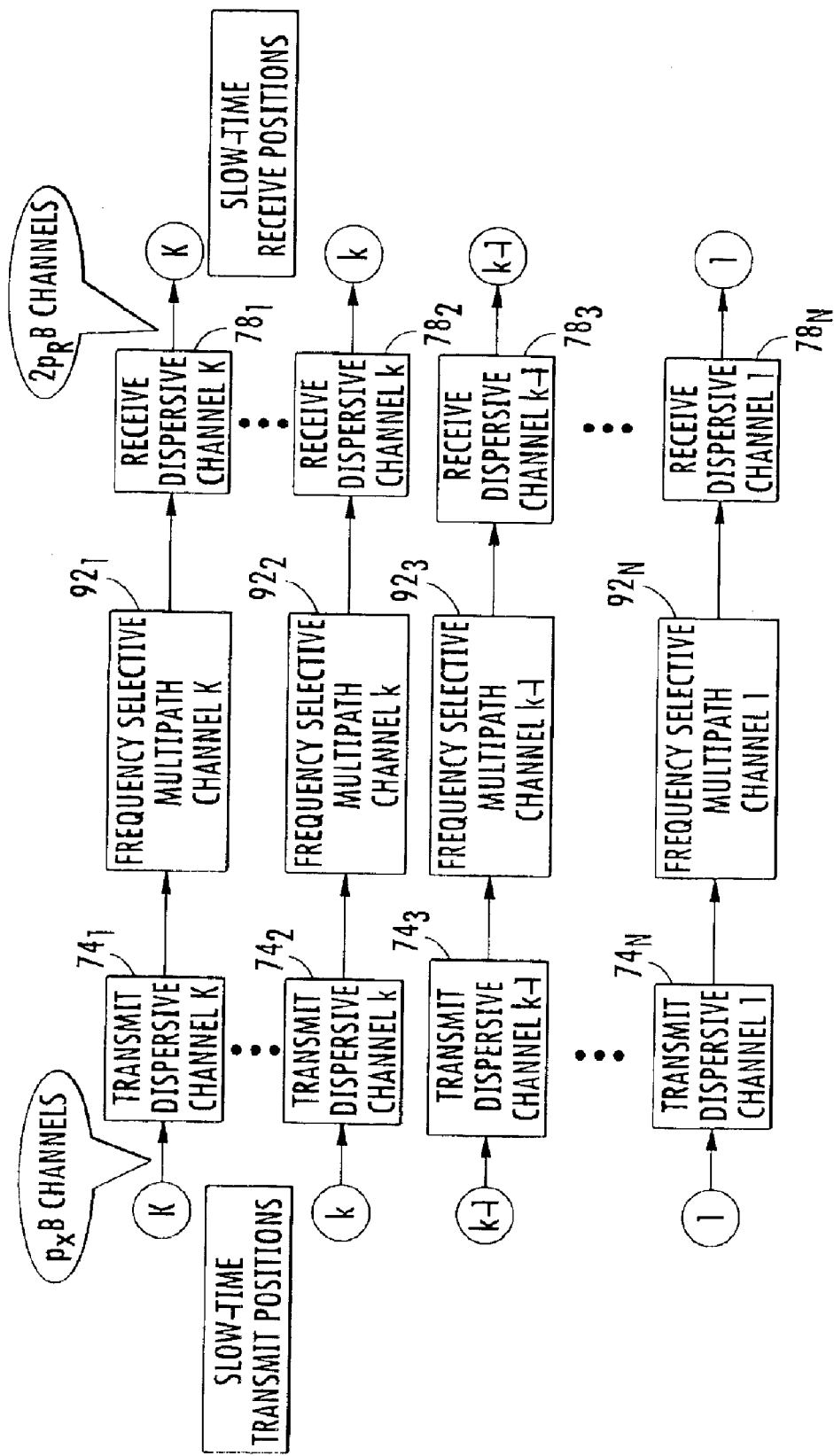
FIG. 5 is a block diagram of a general MIMO channel model in accordance with the present invention.

The difficulties determined to extend communication equalization principles to SAR processing will now be discussed with reference to FIG. 5, which illustrates a general MIMO channel model. First, each of the K slow-time positions is nominally separated, by tens of meters (based on PRI and orbital velocity) from its neighbors. This separation is large enough to cause the SAR 60 to see a different TEC at each position. This translates to a different transmit and receive channel 74, 78 at each slow-time position.

Second, the channel effects over each respective channel of the scene will not be constant or have predictable variations over the collect. This occurs because the line-of-sight to each scatterer varies as a function of a slow-time position k. Changes in the line-of-sight induce different scene return signatures as a function of a slow-time position since each scatterer's return depends on aspect angle, grazing angle, frequency (causing frequency selectivity due to reflectivity variations and/or scatterer spacing), and incident polarization. At the outset there are K frequency selective multipath channels $74_1$–$74_n$ to account for these scene contributions to the overall channel. However, to have a meaningful image, the typical communication signal degradations (i.e., frequency selective multipath) caused by the scene content must be preserved while removing the transmit/receive channel effects. This greatly increases the difficulty of the equalization problem.

Third, the SAR 60 moves between the transmit and receive times. Thus, the transmit channel is not identical to the receive channel. K receive channels $78_1$–$78_n$ are carried to account for this.

Figure 6:
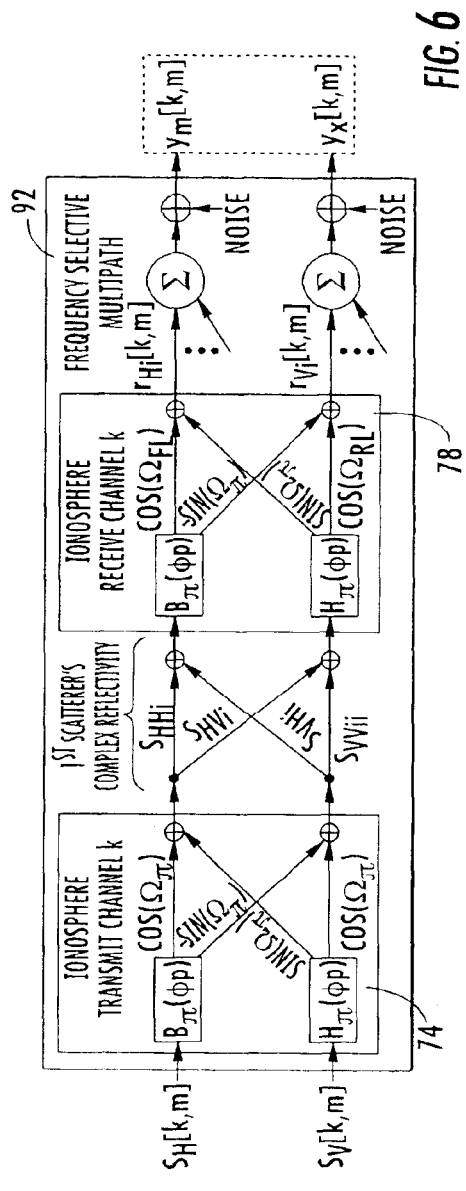
FIG. 6 is a block diagram of a MIMO polarization model for the Faraday rotation approach in accordance with the present invention.

The group delay approach can be extended to the class of polarimetric SARS, as illustrated in FIG. 6, where B narrowband channels each support a 2×4 polarization diversity (e.g., 2 transmit and 4 receive to produce the scattering matrix terms HH, VV, HV, VH). The multi-channel processing described herein can be performed upon the received polarization diverse echo pulses, and the resulting group-delay estimates can be used, in either an uncoordinated or coordinated fashion to compute a compensation for the ionospheric distortion.

In the following, assumptions and considerations to address some of these complexities will be considered. These assumptions are made for purposes of developing and simulating compensation techniques. In situations where these assumptions are not true, they may be treated as approximations, and the compensation methods developed will work with somewhat diminished effectiveness.

An assumption is made that the platform motion over time between the H and V pulses can be neglected. This means that the H and V transmit channels are identical. Further, as is commonly assumed, the scene variations due to grazing and aspect angle variations over the PRI period or H/V doublet can be neglected.

To further remove some of the variables to make the problem more tractable, another assumption is made that the motion of the SAR 60 between transmit and receive times (i.e., nominally a few meters for a low earth orbit satellite) is negligible. This means that the transmit and receive channels 74, 78 are identical sections of the ionosphere 62, yielding identical dispersions and Faraday rotations. Thus, the model illustrated in FIG. 5 has been simplified The transmit and receive channels 74, 78 for slow time positions k are identical. Also, the common assumption is made that the scattering is reciprocal.

To further simplify the problem for purposes of first-order simulation, the TEC within the beam is assumed to be constant for a particular slow-time position k. However, the scene-induced frequency selective multipath $92_1$–$92_n$ still complicates the equalization, because, as discussed above, it must not be removed from the received echo pulse data. As will be shown, the Faraday rotation based processing is not as sensitive as the group delay approach. The polarization MIMO structure is useful for the Faraday rotation approach.

Figure 7:
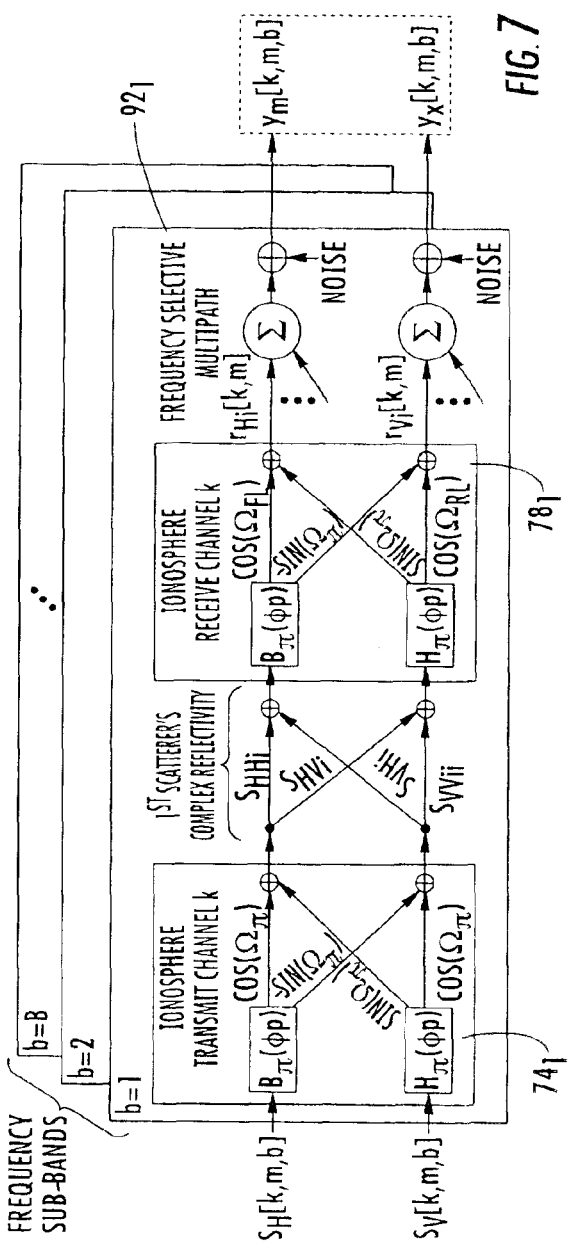
FIG. 7 is a block diagram of a MIMO model with multiple frequency channels, in addition to multiple polarizations, for the group delay approach in accordance with the present invention.

The MIMO concept, over polarization for a frequency broad frequency band, was introduced in FIG. 6. In this model of the propagation medium and scatterers, a single frequency band is assumed. However, when the operating bandwidth exceeds several megahertz, the frequency dependent dispersive characteristics require a channelized approach as illustrated in FIG. 7. In the illustrated MIMO frequency channel model, B narrowband channels each supporting a 2×4 polarization diversity are provided. The intent of introducing B times more channels is to reduce the frequency selective effects of the scene.

In the preferred embodiment of this MIMO (i.e., sub-banded) approach, sufficiently narrow sub-bands adjacent in frequency can be time correlated to yield the relative delay. This is because the sufficiently narrow bands adjacent in frequency interact with the illuminated scene nearly identically. Thus, directly using the group delay response would be more practical as compared to the frequency selectivity due to minimizing the constructive and destructive interfering of the scatterers. However, selection of the bandwidth for each channel is non-trivial and requires several considerations. First, a large channel bandwidth is necessary to preserve range resolution in the scene enabling exploitation of the scene content. Second, the bandwidth must be small enough to allow the channels to be considered linear phase, i.e., nearly constant group delay. Third, to keep computation reasonable, the number of channels should be limited, and this in turn impacts the channel bandwidth for a given chirp.

After some research and analysis, a particular instance of the design employed non-overlapping channels of nominally 18.75 MHz bandwidth (−3 dB, two-sided) channels were selected. At 20 MHz the channels are nominally at −30 dB. These channel bandwidths are for illustrative purposes, and do not preclude other channel bandwidths from being used. The MIMO frequency channel model is thus useful for the group delay approach. The current Faraday rotation approach does note channelize the data since its approach to determining the TEC is different.

The sub-band approach to group delay equalization will now be discussed in greater detail with reference to FIGS. 8–11. The 1-dimensional channelizer group delay approach will be discussed first, followed by discussion of the 2-dimensional channelizer group delay approach. The concept behind the 1-dimensional channelizer is that while the amplitude response of the overall channel is not usable due to scatterer induced multipath fading, the group delay still can be exploited. This is possible because the primary dispersive effects in the VHF/UHF band is the ionosphere. For most scatterers of interest, their dispersion contribution is negligible.

The key idea is that with sufficiently narrowband and closely spaced channels, the range profiles (i.e., received pulse shape) of adjacent frequency bands will have high correlation. Also, for sufficiently narrowband channels an assumption is made that the group delay can be modeled as a constant. Of course, this is not exact but if the approximation is valid to within 10% across the band, then an autofocus algorithm in the IFP should be able to correct residual errors. It is also noted that the approximation improves as frequency is increased.

One issue concerning the channel bandwidth is that it should remain large enough to retain some features for correlation. It is believed that 20 MHz channels provide a good balance between range resolution of scatterers and linear phase approximations per channel.

Figure 1B:
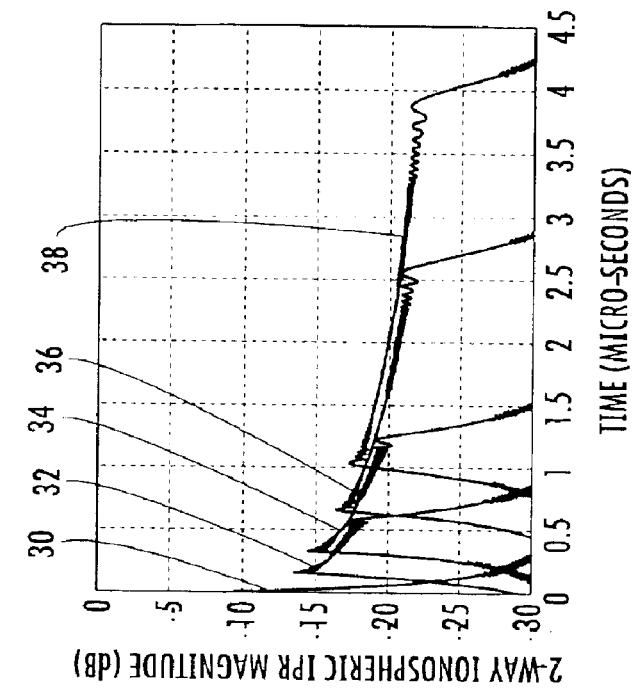
FIGS. 1a and 1b are graphs illustrating group delay variations and the corresponding pulse spreading for pulses in the VHF/UHF band for different TEC units in accordance with the prior art.
Figure 1A:
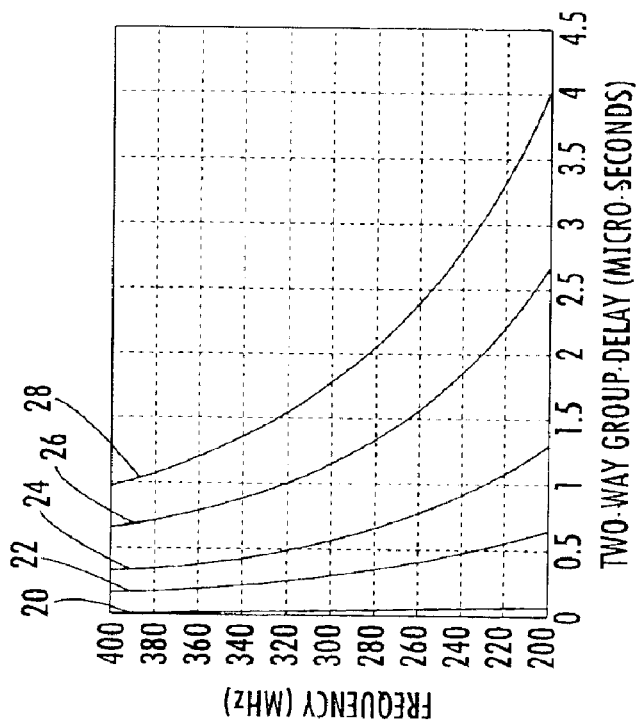
Figure 2:
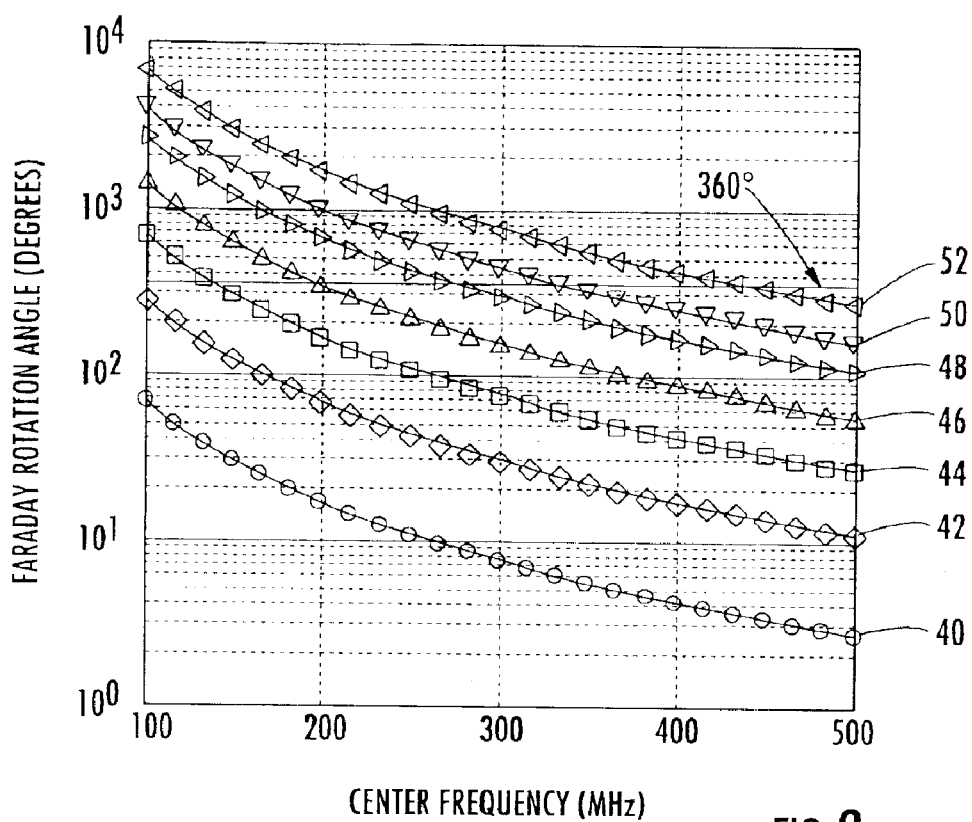
FIG. 2 is a graph illustrating the Faraday rotation for pulses in the VHF/UHF band for different TEC units in accordance with the prior art.

As initially illustrated in FIG. 1a, the group delay is different for each band. However, the TEC is the same and there is a direct and known relation between these two values. By converting measured band-band group delay variations to TEC values, a variance reduction can be achieved. This is because each PRI yields B-1 estimates of the TEC. The benefit is that now the correction per band does not rely solely on a single measurement per band. In this approach, a least-squares fit, or any other suitably chosen fit to the measured data, may be used to determine the TEC in each band.

Figure 8:
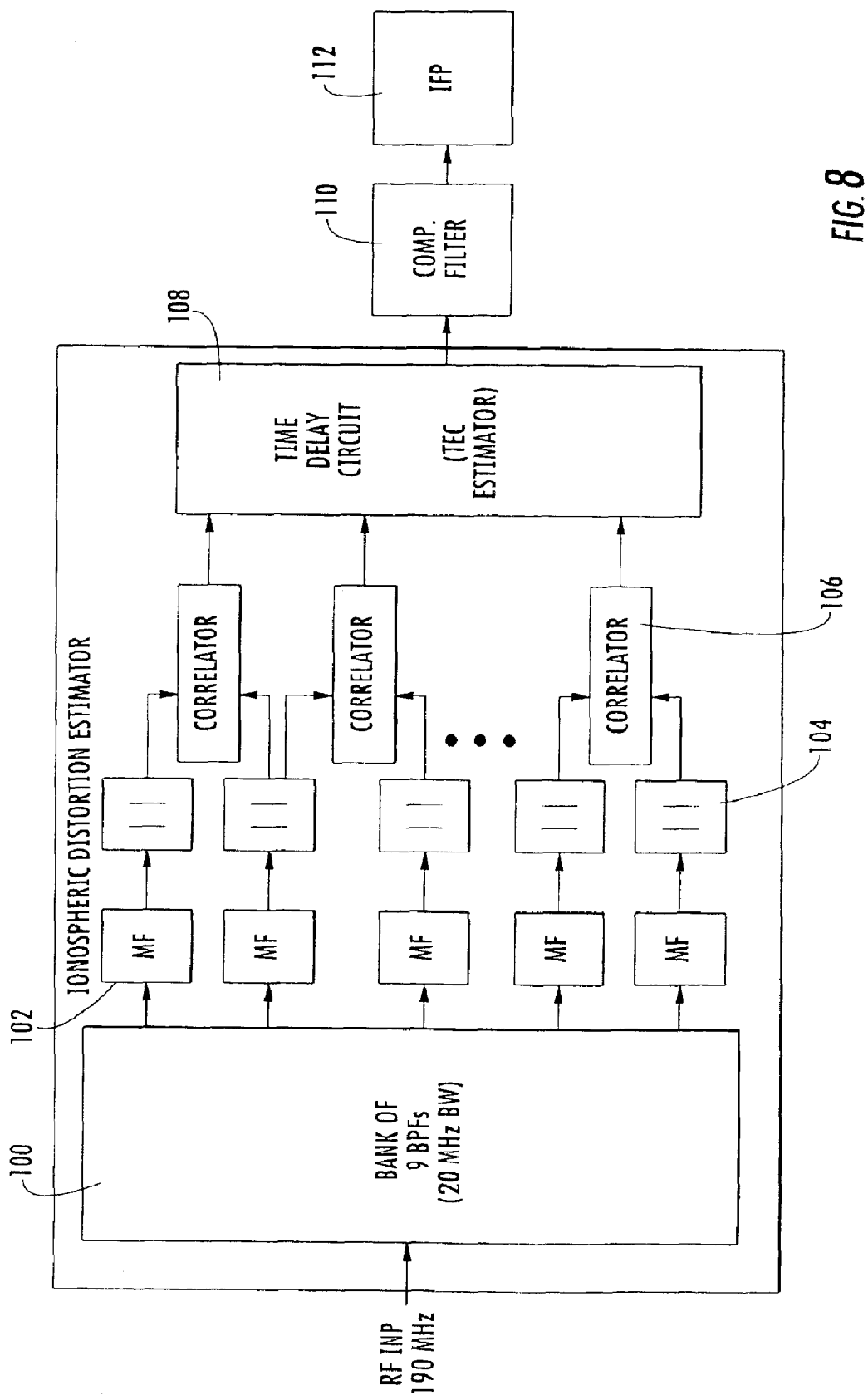
FIG. 8 is a block diagram of a 1-dimensional channelizer in accordance with the present invention.

Referring now to FIG. 8, an approach to the 1-dimensional group delay variation measurements will now be discussed. The RF signal can be any polarization desired. The operating principle is that the 1-dimensional range profiles between adjacent frequency bands will be correlated to provide a pulse shape for determining delay. A 9-band channelizer 100 is used to process the central 180 MHz of a 190 MHz chirp. The channelizer 100 is designed to have outputs down converted to a complex baseband signal. This removes the effects of frequency offset between bands. The matched filters 102 are matched to a point target response, and the time series output from the filters represent 1-dimensional range compressed data per band per PRI.

The matched filter outputs are then converted to magnitude values via absolute value circuits 104. This is done to correlate solely on the shape, i.e., reflectivity magnitude, and not the phase. This is because the phase varies on the scale of a wavelength and as such it is an unreliable parameter. The range profile is an envelope type feature of the return signal and is more robust. The range profiles from adjacent bands are correlated via sliding-time correlators 106 and each respective time delay offset is determined in a time delay circuit 108. Each band's time offset is converted to a TEC estimate. The TEC estimates may be used in a least-squares fit approach to produce an effective TEC. This value is used for the dispersion compensation in the compensation filter 110 for each band. An image formation processor 112 is connected to the compensation filter 110 for processing to produce an image.

Figure 9:
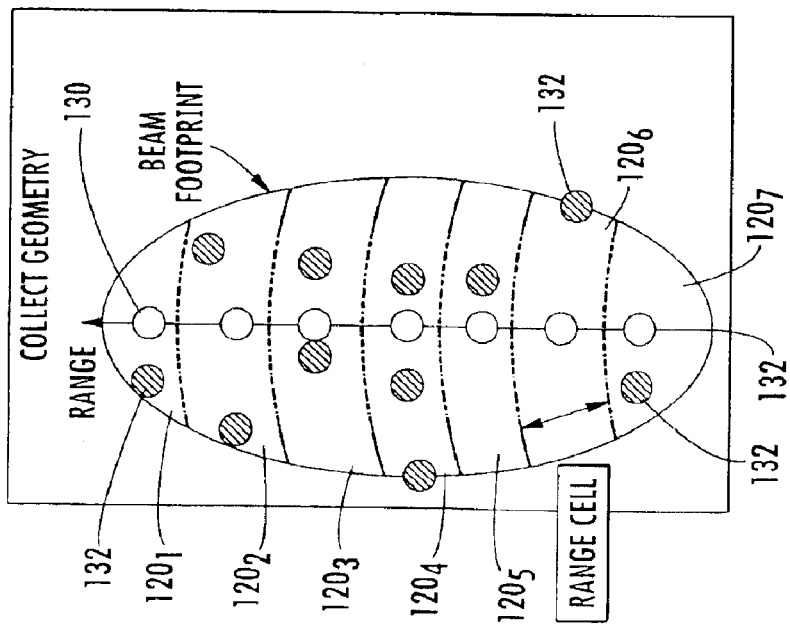
FIG. 9 is a diagram of range cells with scatterers positioned therein for the 1-dimensional channelizer illustrated in FIG. 8.

A notational scatterer distribution favorable for the proposed processing is illustrated in FIG. 9. Each range cell $120_1$–$120_7$ is defined by the channelizer bandwidth with a single effective scatterer 130. Each of the effective scatterers 130 is along the center line 132. The effective scatterer 130 is determined by the coherent integration over each range cell $120_1$–$120_7$. The dominant scatterers 132 not on the centerline 132 contribute the most to a return from a particular range cell $120_1$–$120_7$. As long as the scene return has a significant number of range cells where a single effective scatterer 130 models the return effectively, the algorithm performs well. Although a number of equally spaced scatterers are shown, the spacing need not be equal and only one reasonably isolated scatterer is required to determine the group delay.

When the effective scatterers 130 are not isolated but occur in a range cell $120_1$–$120_7$, then difficulties can arise due to scintillation effects across even the narrow bands. This becomes a significant issue when attempting to use the entire return or when trying to isolate candidate strong returns for isolated point processing. In the scenes where all the scatterers in the scene are nominally the same value, the speckle induced causes the correlation function to have great difficulty because the return pulse shape differs greatly from band-band. This difficulty is handled by extending the 1-D approach to a 2-D approach (discussed in more detail below), where some trade-offs are made to generate a beneficial increase in cross-range resolution to isolate interfering scatterers.

Figure 10:
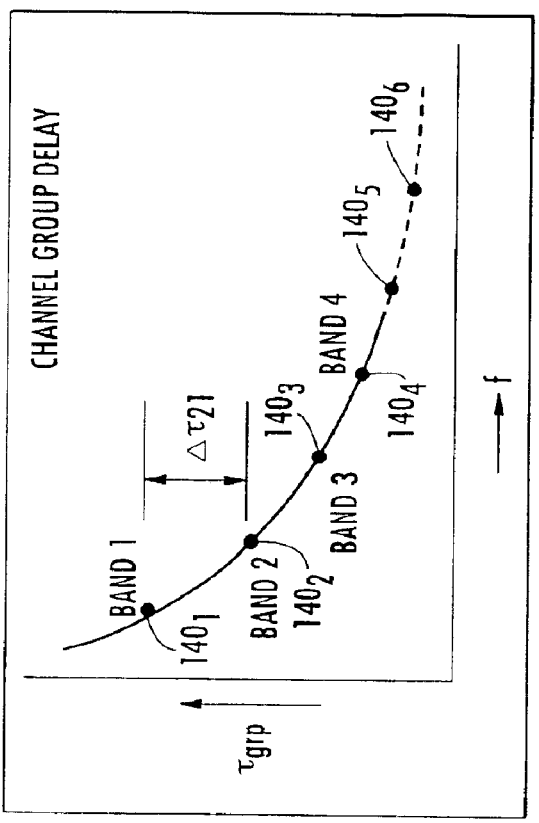
FIG. 10 is a graph illustrating group delays between bands within each pulse for the 1-dimensional channelizer illustrated in FIG. 8.

The conversion between the sub-band time difference of arrival measurement and TEC will now be discussed with reference to FIG. 10 and the following equations. The resulting TEC estimate is the data needed to determine the proper compensation of the channel for both the group-delay dispersion and Faraday rotation effects. The relative time-delays available from the channelized measurements will have a pedestal or offset due to the chirp. Thus, a band of frequencies $140_1$–$140_6$ has a certain known time offset not due to the propagation channel and this must be removed. The per band TEC estimate is shown where it is assumed the data is determined for the center frequencies $140_1$–$140_6$ of each band. Other models may be used as readily appreciated by those skilled in the art. However, for first order processing sufficiently accurate results were obtained.

The actual band-to-band change in the group delay τ and the measured change in the group delay are provided as follows:

$$\Delta \tau_{ij} = \tau_i - \tau_j = \frac{80.6 TEC}{c f_i^2} - \frac{80.6 TEC}{c f_j^2}$$

$$\Delta \tau_{ij}^{meas} = \Delta \tau_{ij}^{act} + \frac{BW_{chnl}}{2\alpha} \text{ for } i > j$$

The per band TEC estimate is calculated as follows:

$$TEC_i = \left(\frac{c}{80.6}\right)\left(\frac{f_j^2 - f_i^2}{f_i^2 f_j^2}\right)\left(\Delta \tau_{ij}^{meas} - \frac{BW_{chnl}}{2\alpha}\right)$$

where c is the speed of light, 80.6 is a well-known constant relating to the ionosphere, $f_i$ and $f_j$ are the center frequencies within each band, $\Delta \tau_{ij}$ is the relative time shift obtained from the 1-D profile correlation from band to band, and $BW_{chnl}$ is the channel bandwidth, which is used, upon division by the chirp slope α, to remove the band-band delay attributable to the transmitted chirp signal.

Figure 11:
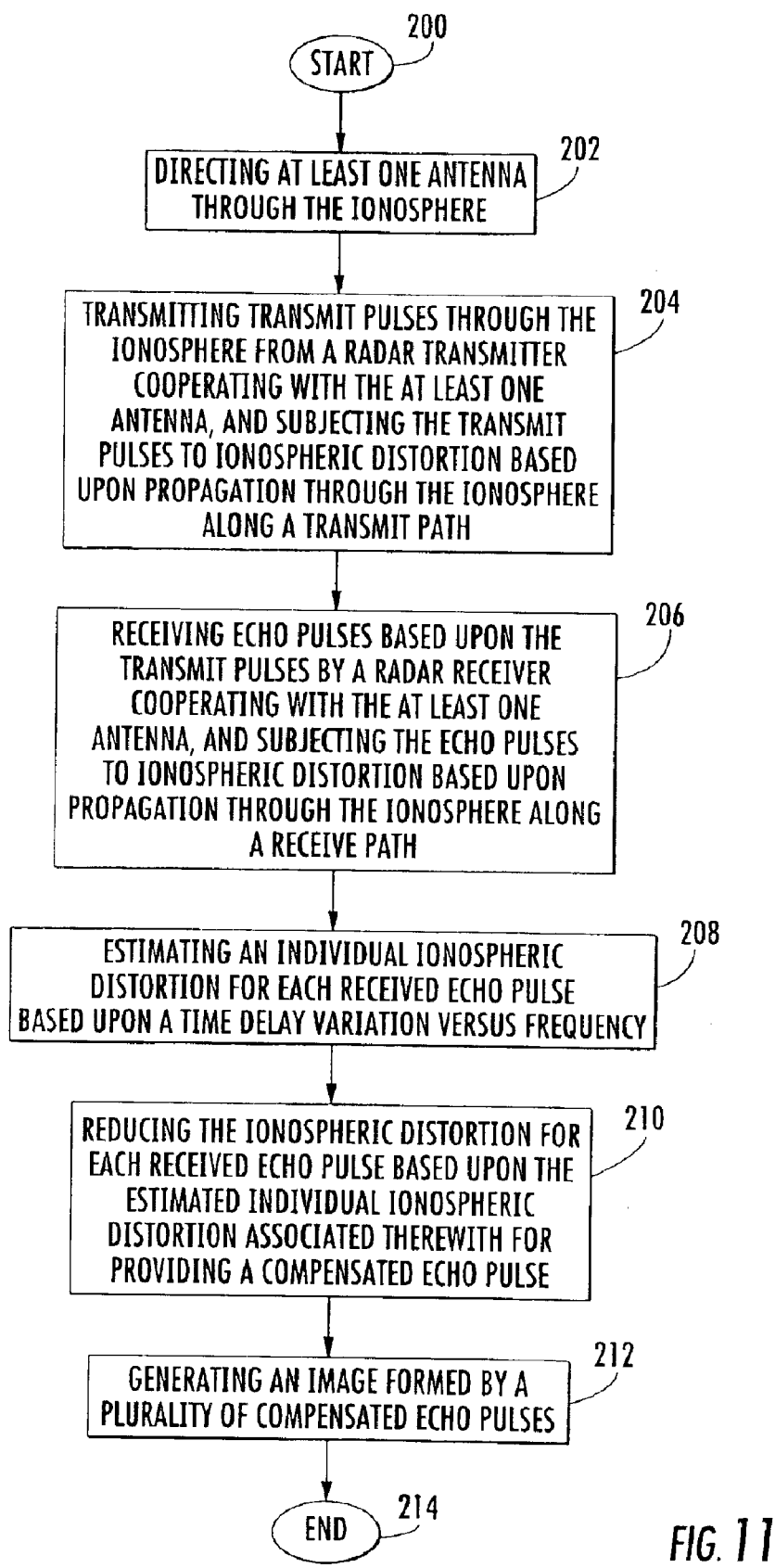
FIG. 11 is a flowchart for operating a SAR based upon the 1-dimensional channelizer illustrated in FIG. 8.

A method for operating a SAR based upon the 1-dimensional channelizer illustrated in FIG. 8 will now be discussed with reference to the flowchart in FIG. 11. From the start (Block 200), the method comprises directing at least one antenna 72 through the ionosphere 62 at Block 202, and transmitting transmit pulses through the ionosphere from a radar transmitter 70 cooperating with the antenna, whereupon the transmit pulses undergo ionospheric distortion based upon propagation through the ionosphere along a transmit path 74 at Block 204.

Echo pulses are received at Block 206 based upon the transmit pulses by a radar receiver 76 cooperating with an antenna 79, after the echo pulses have undergone an additional ionospheric distortion based upon propagation through the ionosphere 62 along a receive path 78. The method further comprises estimating the ionospheric distortion for each received echo pulse based upon a time delay variation versus frequency at Block 208, and reducing the ionospheric distortion for each received echo pulse based upon the estimated ionospheric distortion associated therewith for providing a compensated echo pulse at Block 210. An image formed by a plurality of compensated echo pulses is formed at Block 212. The method ends at Block 214.

Figure 12:
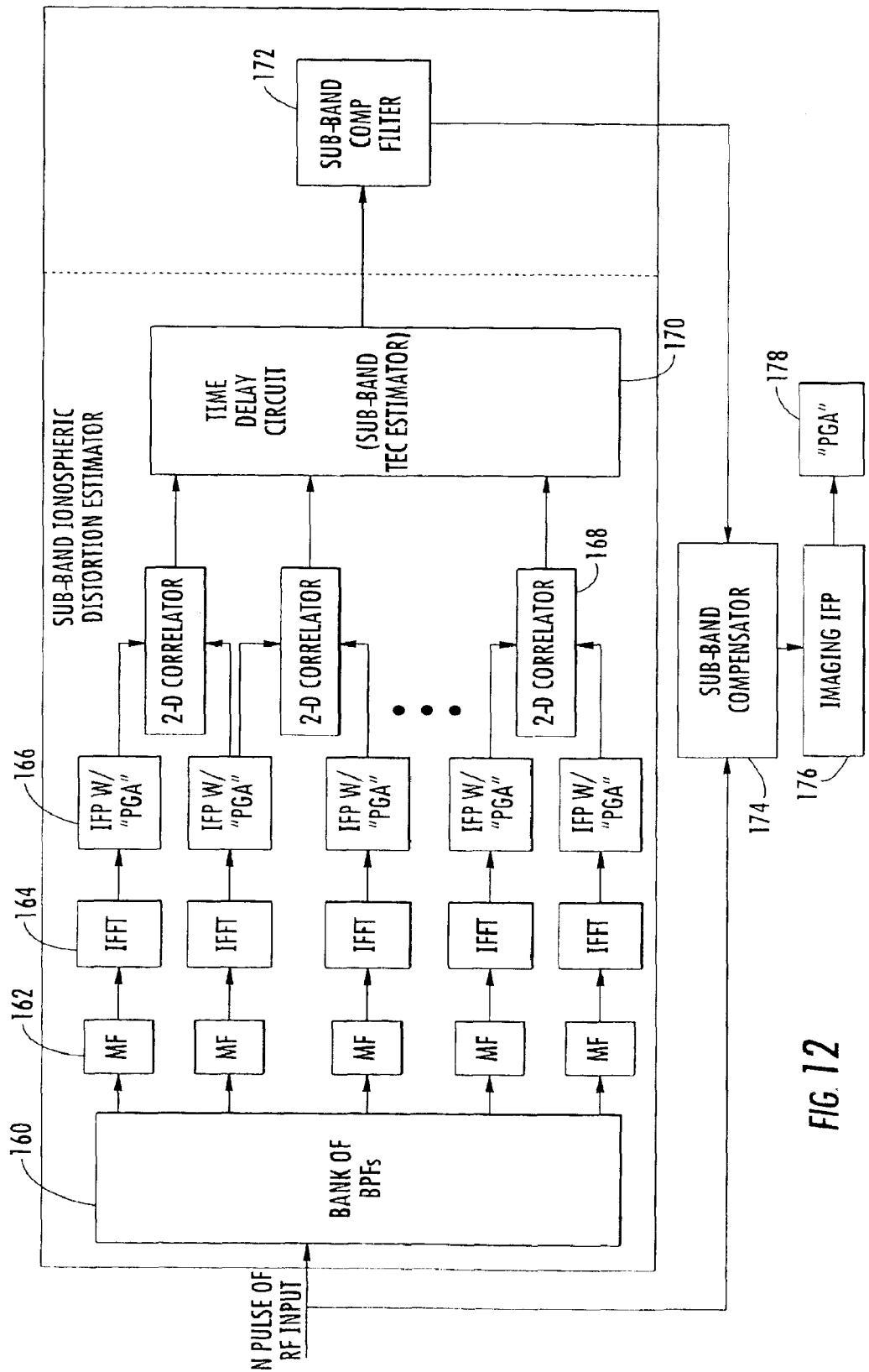
FIG. 12 is a block diagram of a 2-dimensional channelizer in accordance with the present invention.

The 2-dimensional channelizer group delay concept will now be discussed with reference to FIG. 12. The concept behind the 2-dimensional channelizer is to both provide range and angle isolation of scatterers. In this approach, an N pulse sub-aperture is used to provide angular resolution on the scatterers to define a resolution cell, i.e., range and azimuth. The difficulty is the varying TEC over the N pulse aperture. The total TEC per PRI is comprised of two terms. A bulk or average TEC, and a variation about the bulk TEC value.

The processing is a two-step process. The first step is to compensate the gross TEC over a sub-aperture of N pulses. The second step is for the main IFP to compensate the residual variations across the aperture. The second step can be accomplished by any standard image formation processing algorithm suitable for a particular imaging objective.

To derive an estimate of the gross TEC for each sub-aperture of N pulses, the RF input is sub-divided into a number of sub-bands. The sub-band data is down converted to baseband via a bank of bandpass filters 160. Matched filtering of each sub-band is performed by a matched filter 162 for producing a complex 1-dimensional range profile. The profile data is then converted to spatial frequencies via an inverse fast Fourier transform or other equivalent transform 164.

The data is then processed by a sub-image IFP 166 to remove the TEC variation across the N pulse sub-aperture. It is anticipated that a suitable autofocus algorithm (nominally shown as PGA or phase gradient autofocus) would suitably remove traditional SAR errors for which it is designed, and in the process would likely remove some fine TEC variation across each sub-aperture. This would provide the necessary reduction in TEC variably across an N pulse sub-aperture. It is expected that the bulk TEC value for the aperture would remain, and still render the resulting image likely unusable for many applications.

However, it is expected that the effects caused by the bulk TEC over the N pulse aperture are measurable using a 2-dimensional correlator 168. Thus, the range offset between sub-bands may be recoverable even though the sub-aperture images are blurred. This is because the blurring function is expected to be sufficiently similar for adjacent bands. The range offset provides the information to estimate the bulk TEC via a time delay circuit 170. Then the bulk TEC estimate (per aperture) is used to create a dispersion compensation (per aperture) for the sub-band compensation filter 172. The bulk compensation is then applied across the sub-apertures in a sub-band compensator 174. The final imaging IFP 176 and a suitable autofocus algorithm (e.g., PGA) 178 are used to correct the effects of the residual TEC variations.

Figure 13:
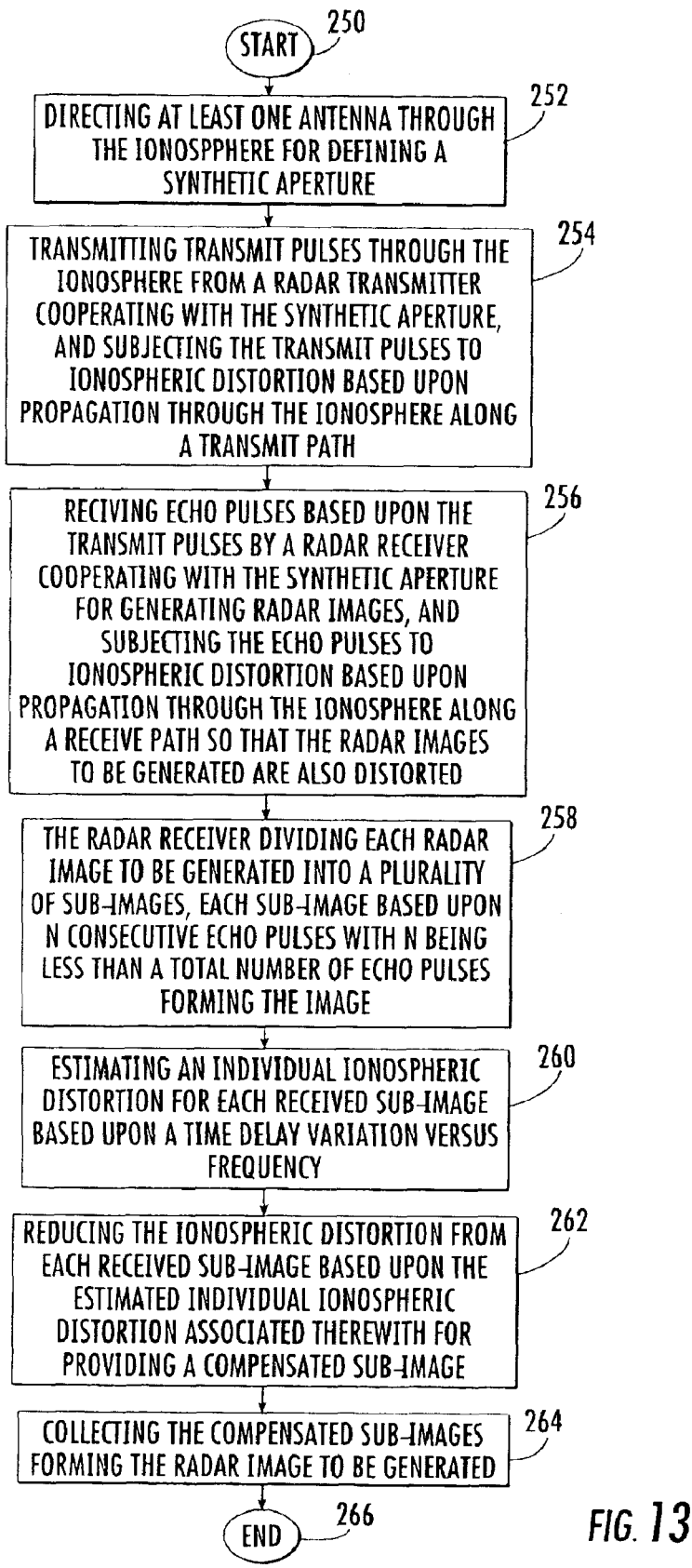
FIG. 13 is a flowchart for operating a SAR based upon the 2-dimensional channelizer illustrated in FIG. 12.

A method for operating a SAR based upon the 2-dimensional channelizer illustrated in FIG. 12 will now be discussed with reference to the flowchart in FIG. 13. From the start (Block 250), the method comprises directing at least one antenna 72 through the ionosphere 62 at Block 252 for defining a synthetic aperture, and transmitting transmit pulses at Block 254 through the ionosphere 62 from a radar transmitter 70 cooperating with the at least one antenna, whereupon the transmit pulses undergo ionospheric distortion based upon propagation through the ionosphere along a transmit path 74.

Echo pulses based upon the transmit pulses are received at Block 256 by a radar receiver 76 cooperating with the at least one antenna for generating synthetic aperture radar images, after the echo pulses have undergone an additional ionospheric distortion based upon propagation through the ionosphere 62 along a receive path 78.

The radar receiver 76 divides each radar image to be generated into a plurality of sub-images at Block 258, each sub-image being based upon N consecutive echo pulses with N being less than a total number of echo pulses forming the image Formation of these sub-images, with an autofocus-type algorithm, compensates for small-scale TEC variation across each N-pulse sub-aperture. The method further comprises estimating the ionospheric distortion for each received sub-image based upon a time delay variation versus frequency at Block 260 via the 2-D correlation approach described above, reducing the ionospheric distortion from each received sub-image based upon the estimated ionospheric distortion associated therewith for providing a compensated sub-image at Block 262, and collecting the compensated sub-images forming the radar image to be generated at Block 264. The method ends at Block 266.

Figure 14:
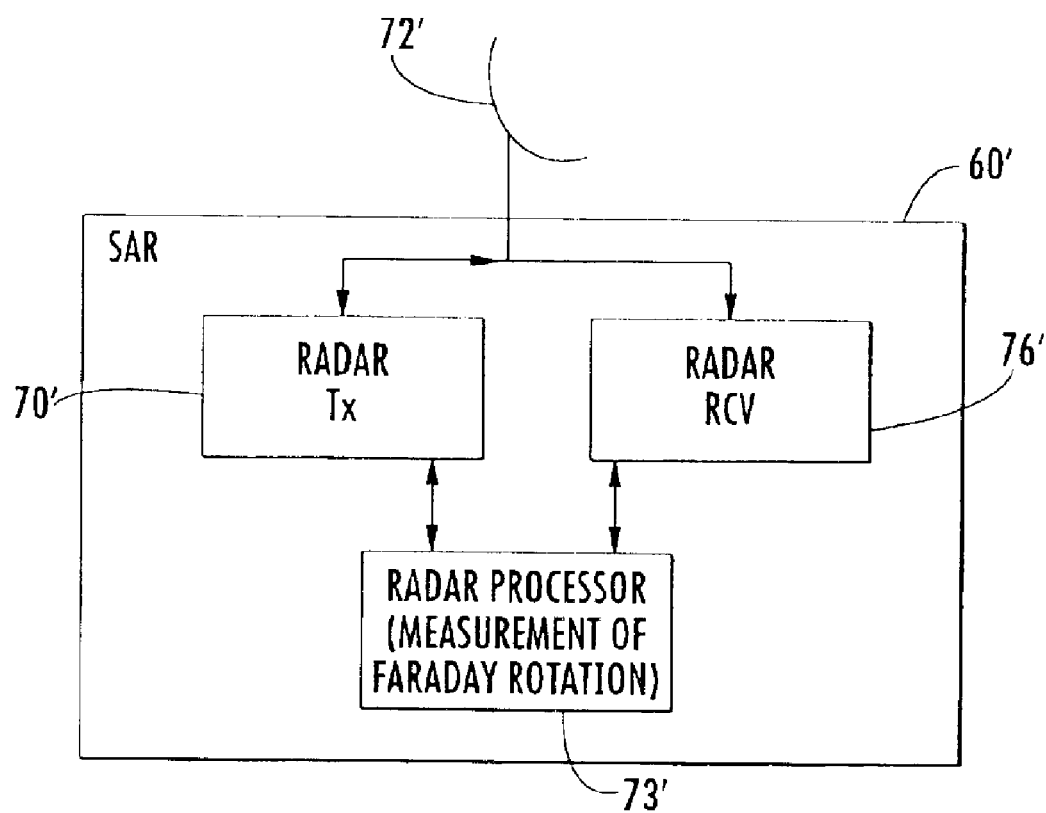
FIG. 14 is a block diagram of a SAR that includes a radar processor to account for the Faraday rotation in accordance with the present invention.

The Faraday rotation based equalization approach will now be discussed. This approach exploits polarimetric SAR data to derive an estimated effective TEC on a per-PRI basis. FIG. 14 is a block diagram of a SAR 60' that includes a radar processor 73' to account for the Faraday rotation in accordance with the present invention. The radar processor 73' is connected to a radar transmitter 70' and a radar receiver 76'. Under the assumptions that a) the cross-talk and channel imbalances are constant over the collect, and b) Faraday rotation is identical on the transmit and receive paths ($\Omega_T = \Omega_R = \Omega$), and c) the scattering process is reciprocal ($S_{HV} = S_{VH} = \Gamma$), the polarimetric SAR model simplifies to the following:

$$\begin{pmatrix} V_{HH} & V_{VH} \\ V_{HV} & V_{VV} \end{pmatrix} =$$

$$A \begin{pmatrix} 1 & \delta_2 \\ \delta_1 & F_R \end{pmatrix} \begin{pmatrix} \cos\Omega & \sin\Omega \\ -\sin\Omega & \cos\Omega \end{pmatrix} \begin{pmatrix} S_{HH} & \Gamma \\ \Gamma & S_{VV} \end{pmatrix} \begin{pmatrix} \cos\Omega & \sin\Omega \\ -\sin\Omega & \cos\Omega \end{pmatrix} \begin{pmatrix} 1 & \delta_3 \\ \delta_4 & F_T \end{pmatrix} + \begin{pmatrix} N_{HH} & N_{VH} \\ N_{HV} & N_{VV} \end{pmatrix}$$

Which is represented by the following:

$$V_m(X) = A \, D_R^T(X) \, F_m(X) \, S_m(X) \, F_m(X) \, D_T(X) + N_m(X)$$

For a large number of scatterers, the polarimetric SAR phase history is given by the following:

$$V_m(X) = \sum_{n=1}^{N} [A D_R^T(X) F_m(X) S_{m,n}(X) F_m(X) D_T(X)] + N_m(X)$$

$$= A D_R^T(X) F_m(X) \left[ \sum_{n=1}^{N} S_{m,n}(X) \right] F_m(X) D_T(X) + N_m(X)$$

where the slant TEC, channel cross-talk terms and channel imbalances are all assumed to be constant over the beam footprint. Under conditions where the noise is negligible, the co-pol and cross-pol channels are perfectly balanced, and the model may be represented by the following:

$$V_m(X) \approx AI F_m(X) \left[ \sum_{n=1}^{N} S_{m,n}(X) \right] F_m(X) I$$

This can be written as follows:

$$V_{HH,m}(X) = A \left[ \cos^2\Omega_m(X) \left( \sum_{n=1}^{N} S_{HH,m,n}(X) \right) - \sin^2\Omega_m(X) \left( \sum_{n=1}^{N} S_{VV,m,n}(X) \right) \right]$$

$$V_{HV,m}(X) =$$
$$A \left[ \left( \sum_{n=1}^{N} \Gamma_{m,n}(X) \right) - \cos\Omega_m(X) \sin\Omega_m(X) \left( \sum_{n=1}^{N} (S_{HH,m,n}(X) + S_{VV,m,n}(X)) \right) \right]$$

$$V_{VH,m}(X) =$$
$$A \left[ \left( \sum_{n=1}^{N} \Gamma_{m,n}(X) \right) + \cos\Omega_m(X) \sin\Omega_m(X) \left( \sum_{n=1}^{N} (S_{HH,m,n}(X) + S_{VV,m,n}(X)) \right) \right]$$

$$V_{VV,m}(X) = A \left[ \cos^2\Omega_m(X) \left( \sum_{n=1}^{N} S_{VV,m,n}(X) \right) - \sin^2\Omega_m(X) \left( \sum_{n=1}^{N} S_{HH,m,n}(X) \right) \right]$$

Combining these four terms provides the following:

$$y_m(X) = \frac{V_{VH,m}(X) - V_{HV,m}(X)}{V_{HH,m}(X) + V_{VV,m}(X)} =$$

$$\frac{A \left[ \sum_{n=1}^{N} (S_{HH,m,n}(X) + S_{VV,m,n}(X)) \right] (2\cos\Omega_m(X) \sin\Omega_m(X))}{A \left[ \sum_{n=1}^{N} (S_{HH,m,n}(X) + S_{VV,m,n}(X)) \right] (\cos^2\Omega_m(X) - \sin^2\Omega_m(X))} = \tan 2\Omega(X)$$

which gives a quantity that only depends on the Faraday rotation angle $\Omega$ and not on the scattering coefficients of the scene.

Thus, with ideal phase history data and with $S_{HV}$ of the scene equal to $S_{VH}$ of the scene we can use co- and cross-polarization measurements of the echo pulse(s) to generate the following ratio:

$$\frac{V_{HV}(f) - V_{VH}(f)}{V_{HH}(f) + V_{VV}(f)} = \tan[2\Omega(f)] \text{ where } \Omega(f) = \alpha \frac{TEC}{f^2}$$

Thus, we can obtain an estimate of the frequency variation of the Faraday rotation angle $\Omega$, and hence of the effective TEC of the ionosphere on a given PRI. By taking the arc-tangent and unwrapping the angle, and dividing by $2\alpha$ to obtain $\Omega(f)$, at frequencies $f_1$ and $f_2$, we obtain the following:

$$\Omega(f_1) - \Omega(f_2) = \alpha TEC \left( \frac{1}{f_1^2} - \frac{1}{f_2^2} \right) \Rightarrow TEC = \frac{\Omega(f_1) - \Omega(f_2)}{\alpha(1/f_1^2 - 1/f_2^2)}.$$

From this estimated TEC value, compensations can be generated for both the Faraday rotation and the group-delay dispersion induced by the ionosphere. To correct the group-delay dispersion, an all-pass phase-adjustment filter can be designed and applied in a feedforward arrangement 88. The appropriate phase adjustments can be obtained from the relationship between the TEC and the group delay as a function of frequency:

$$\tau_g(f) \approx \left( \frac{80.6}{cf^2} \right) TEC_s.$$

To correct the Faraday rotation, a compensating rotation is applied as follows:

$$\begin{pmatrix} V'_{HH} & V'_{VH} \\ V'_{HV} & V'_{VV} \end{pmatrix} = \begin{pmatrix} \cos\Omega & -\sin\Omega \\ \sin\Omega & \cos\Omega \end{pmatrix} \begin{pmatrix} V_{HH} & V_{VH} \\ V_{HV} & V_{VV} \end{pmatrix}.$$

The resulting components $V'_{xx}$ form the compensated phase history data, which may be used in the remainder of the SAR processing (i.e., image formation processing) as normal.

Errors may arise in the estimated Faraday rotation angle, owing to timing errors between the HV and VH channels, antenna cross-talk between polarizations, channel imbalances and/or biases, differences in the position of the SAR platform at the time of the H and V transmissions, and noise sources common to SAR signals. Three techniques may be used to address these errors. The first of these is an FFT rotation estimation method, where the sine of the estimated Faraday rotation angle, over several frequencies, is indexed against $1/f^2$, where f is the frequency. The expression $\sin(\alpha TEC_{est}/f^2)$ is a sinusoid, where $1/f^2$ is considered to be the independent variable and $\alpha TEC_{est}$ is a frequency-like variable. To obtain an improved estimate of this frequency-like variable, the Fourier transform of the indexed $\sin(\Omega)$ is taken and searched for a peak value. The index of this peak value provides an improved estimate of the TEC.

The second technique for addressing the errors in the estimated Faraday rotation angle is a small-angle estimation method. If the Faraday rotation angle $\Omega$ is small (e.g., $\leq 10$ degrees), then $$\frac{V_{HV}(f) - V_{VH}(f)}{V_{HH}(f) + V_{VV}(f)} = \tan[2\Omega(f)] \approx 2\Omega(f) = 2\frac{\alpha TEC}{f^2},$$

and we can obtain an estimate of the TEC by taking the following average over a plurality of frequencies in each pulse:

$$\text{mean}_{all\ f}\left[\left(\frac{V_{HV}(f) - V_{VH}(f)}{V_{HH}(f) + V_{VV}(f)}\right)\frac{f^2}{2\alpha}\right] = TEC_{est}.$$

The small-angle estimation method can be combined with the FFT rotation estimation method, where a compensating rotation is applied to the echo pulse based on the TEC estimated from the FFT method, then any residual rotation that remains in the polarimetric ratio can be determined using the small-angle method. Then a composite TEC estimate is calculated as the sum of the TEC estimates from the FFT and small angle methods, and a compensating rotation is applied to the original (uncompensated) echo pulse.

The third technique for addressing the errors in the estimated Faraday rotation angle is a differential pulse method, where the difference in the TEC between the $n^{th}$ and $k^{th}$ pulses is calculated as follows. Letting the polarimetric ratios $[V_{HV}(f)-V_{VH}(f)]/[V_{HH}(f)+V_{VV}(f)]$ for the $n^{th}$ and $k^{th}$ pulses be represented as $Q_n(f)$ and $Q_k(f)$, respectively, we can write $$Q_n(f) - Q_k(f) = \tan(2\Omega_n(f)) - \tan(2\Omega_k(f)) \approx 2\frac{d\tan\Omega}{d\Omega}[\Omega_n(f) - \Omega_k(f)]$$

From this we can write, since the derivative of tan (x) is $\sec^2$ (x)=1+$\tan^2$ (x), $$\frac{Q_n(f) - Q_k(f)}{1 + Q_n^2(f)} = 2[\Omega_n(f) - \Omega_k(f)] = 2\alpha\frac{TEC_n - TEC_k}{f^2},$$

from which we can obtain the average (over frequency) difference in TEC from pulse n to pulse k:

$$\text{mean}_{all\ f}\left(\frac{Q_n(f) - Q_k(f)}{1 + Q_n^2(f)}f^2\right)\frac{1}{2\alpha} = \Delta TEC.$$

By using this difference in the estimated TEC between successive pulses in the collect, the overall effect of the errors in the estimated Faraday rotation angle can be determined and/or mitigated.

Figure 15:
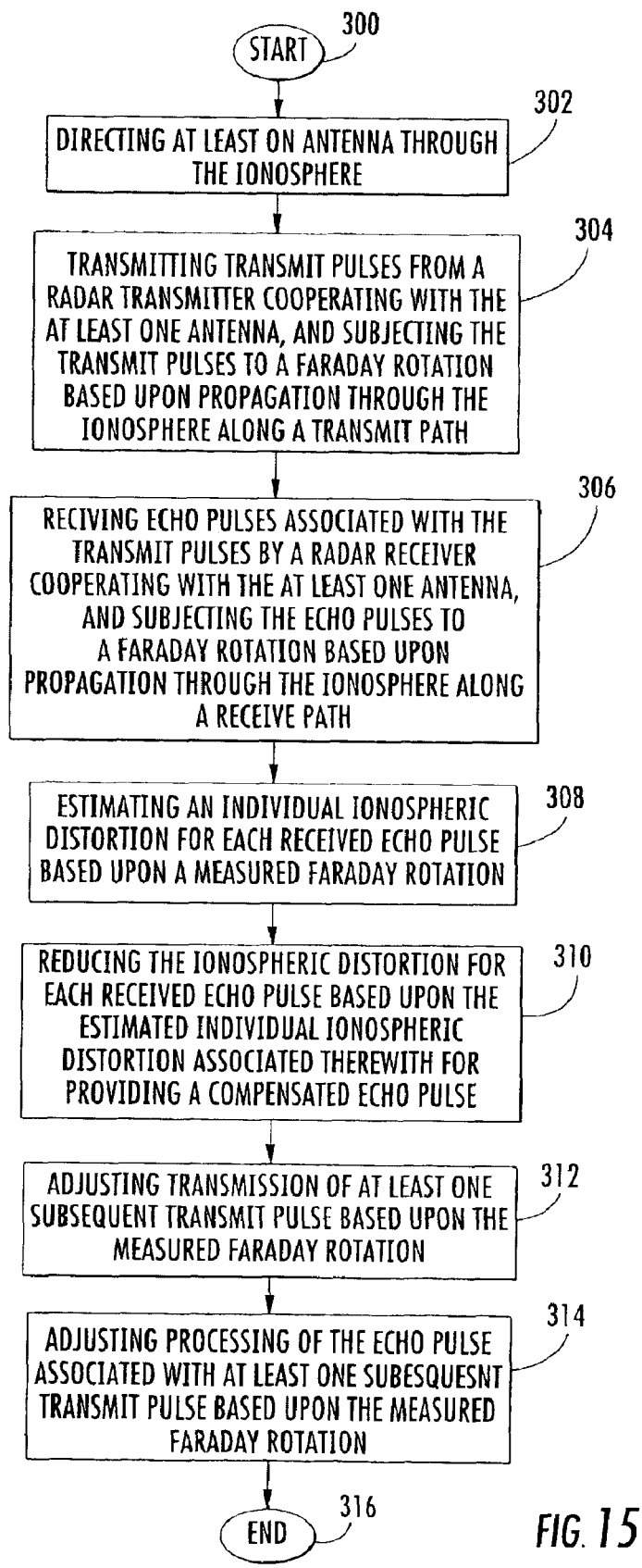
FIG. 15 is a flowchart for operating the SAR illustrated in FIG. 14.

A method for operating a SAR 60' based upon the Faraday rotation approach will now be discussed with reference to FIG. 15. From the start (Block 300), at least one antenna 72' is directed through the ionosphere 62 at block 302. Transmit pulses are transmitted from a radar transmitter 70' cooperating with the antenna 72' at Block 304, and subjects the transmit pulses to a Faraday rotation based upon propagation through the ionosphere along a transmit path 74.

At Block 306, echo pulses associated with the transmit pulses are received by a radar receiver 76' cooperating with the antenna 72', and subjects the echo pulses to a Faraday rotation based upon propagation through the ionosphere 62 along a receive path 78.

Processing to account for the Faraday rotation introduced by propagation through the ionosphere 62 is performed by the radar processor 73'. In particular, this processing comprises reducing the ionospheric distortion for each received echo pulse based upon the estimated individual ionospheric distortion associated therewith for providing a compensated echo pulse at Block 308.

The method further comprises adjusting transmission of at least one subsequent transmit pulse based upon the measured Faraday rotation at Block 312. Alternatively, the method further comprises adjusting processing of the echo pulse associated with the at least one subsequent transmit pulse based upon the measured Faraday rotation at Block 314. The processing accounts for the Faraday rotation on a per pulse basis. The method ends at Block 316.

The radar transmitter 70' generates the transmit pulses so that each transmit pulse comprises a modulated signal having a predetermined bandwidth. Estimating the Faraday rotation is based upon estimating the Faraday rotation for a plurality of frequencies within the predetermined bandwidth for the echo pulse associated with the at least one given transmit pulse. The modulated signal comprises a linear frequency modulated chirp signal, as readily appreciated by those skilled in the art.

In conclusion, compensating for effects of the ionosphere is challenging for space-borne SARs operating in the VHF/UHF band Communication techniques are not directly applicable because there is a need to retain scatterers' frequency-selective multipath dispersion but compensate other dispersions. A 1-dimensional (range) and a 2-dimensional (range and cross-range) MIMO equalization scheme are provided for the group delay approach. The Faraday rotation approach is preferable to the group delay approach because the group delay is a difficult parameter to exploit, and the Faraday rotation is more robust because it is independent of the frequency-selective multipath dispersion of the scene.

Many modifications and other embodiments of the invention will come to the mind of one skilled in the art having the benefit of the teachings presented in the foregoing descriptions and the associated drawings. In addition, other features relating to the synthetic aperture radar is disclosed in copending patent application filed concurrently herewith and assigned to the assignee of the present invention and is entitled SYNTHETIC APERTURE RADAR (SAR) COMPENSATING FOR IONOSPHERIC DISTORTION BASED UPON MEASUREMENT OF THE GROUP DELAY, AND ASSOCIATED METHODS, Ser. No. 10/984,474, filed Nov. 9, 2004. Therefore, it is to be understood that the invention is not to be limited to the specific embodiments disclosed, and that modifications and embodiments are intended to be included within the scope of the appended claims.

That which is claimed is:

1. A synthetic aperture radar (SAR) for a moveable platform comprising:

at least one antenna movable with the platform and directed through the ionosphere;

a radar transmitter cooperating with said at least one antenna to propagate transmit pulses through the ionosphere, and subjecting the transmit pulses to a Faraday rotation based upon propagation through the ionosphere along a transmit path;

a radar receiver cooperating with said at least one antenna to receive echo pulses through the ionosphere based upon the transmit pulses, and subjecting the echo pulses to a Faraday rotation based upon propagation through the ionosphere along a receive path; and a radar processor connected to said radar transmitter and radar receiver for processing to account for the Faraday rotation introduced by propagation through the ionosphere by estimating an individual ionospheric distortion for each received echo pulse based upon a measured Faraday rotation, and reducing the ionospheric distortion for each received echo pulse based upon the estimated individual ionospheric distortion associated therewith for providing a compensated echo pulse.

2. A SAR according to claim 1 wherein said radar transmitter adjusts transmission of at least one subsequent transmit pulse based upon the measured Faraday rotation.

3. A SAR according to claim 1 wherein said radar receiver adjusts processing of the echo pulse associated with at least one subsequent transmit pulse based upon the measured Faraday rotation.

4. A SAR according to claim 1 wherein said radar processor accounts for the Faraday rotation on a per pulse basis.

5. A SAR according to claim 1 wherein said radar transmitter generates the transmit pulses so that each transmit pulse comprises a modulated signal having a predetermined bandwidth; and wherein said radar processor measures the Faraday rotation for a plurality of frequencies within the predetermined bandwidth for the echo pulse associated with at least one given transmit pulse.

6. A SAR according to claim 5 wherein the modulated signal comprises a linear frequency modulated chirp signal.

7. A SAR according to claim 1 wherein said radar processor measures the Faraday rotation based upon cross-polarization and co-polarization measurements for the echo pulse associated with at least one given transmit pulse based upon the following polarimetric equation $$\frac{V_{HV}(f) - V_{VH}(f)}{V_{HH}(f) + V_{VV}(f)},$$

where $V_{HH}$ represents measurement of a co-polarized horizontal backscatter echo signal, $V_{VV}$ represents measurement of a co-polarized vertical backscatter echo signal, and $V_{VH}$ and $V_{HV}$ represent measurements of corresponding cross-polarized backscatter echo signals.

8. A SAR according to claim 7 wherein the polarimetric equation is equal to tan (2Ω(f)), and $$\Omega(f) = \alpha \frac{TEC}{f^2},$$

where $\Omega(f)$ is equal to the measured Faraday rotation at frequency f for the echo pulse associated with the at least one given transmit pulse, α is equal to a fixed constant, and TEC is a total electron content of the ionosphere for the echo pulse associated with the at least one given transmit pulse; and wherein said radar processor derives from $\Omega(f)$ at multiple frequencies an estimate of the TEC for the echo pulse associated with the at least one given transmit pulse for estimating the individual ionospheric distortion thereof.

9. A SAR according to claim 8 wherein said radar transmitter generates the transmit pulses so that each transmit pulse comprises a modulated signal having a predetermined bandwidth; wherein said radar processor measures the Faraday rotation for a plurality of frequencies within the predetermined bandwidth for the echo pulse associated with the at least one given transmit pulse; and wherein said radar processor compensates for errors in the measured Faraday rotation, and therefore the estimated TEC, by determining a plurality of sine values for the plurality of measured Faraday rotations within the echo pulse;

determining a Fourier transform for the plurality of sine values; and selecting a peak value from the Fourier transform, with a position of the peak value corresponding to a corrected estimate of the TEC.

10. A SAR according to claim 8 wherein said radar transmitter generates the transmit pulses so that each transmit pulse comprises a modulated signal having a predetermined bandwidth; wherein said radar processor measures the Faraday rotation for a plurality of frequencies within the predetermined bandwidth for the echo pulse associated with the at least one given transmit pulse; and wherein said radar processor compensates for errors in the measured Faraday rotation by averaging the estimated TEC at multiple frequency pairings within the echo pulse.

11. A SAR according to claim 8 wherein if the measured Faraday rotation is less than or equal to 10 degrees, then a corrected estimate of the TEC is produced by taking the following average for a plurality of frequencies with the echo pulse:

$$\text{mean}_{all\ f}\left[\left(\frac{V_{HV}(f) - V_{VH}(f)}{V_{HH}(f) + V_{VV}(f)}\right)\frac{f^2}{2\alpha}\right] = TEC_{est}.$$

where $V_{HH}$ represents measurement of a co-polarized horizontal backscatter echo signal, $V_{VV}$ represents measurement of a co-polarized vertical backscatter echo signal, $V_{VH}$ and $V_{HV}$ represent measurements of corresponding cross-polarized backscatter echo signals, α is equal to a fixed constant, and TEC is a total electron content of the ionosphere for the echo pulse associated with the at least one given transmit pulse.

12. A SAR according to claim 1 wherein the ionosphere has a spatially varying total electron content (TEC) associated therewith; and wherein said radar processor derives from the measured Faraday rotation the TEC for the echo pulse associated with at least one given transmit pulse.

13. A SAR according to claim 1 wherein the measured Faraday rotation for the transmit path is equal to the Faraday rotation for the receive path.

14. A SAR according to claim 1 wherein said radar transmitter and radar receiver operate in the VHF/UHF band.

15. A SAR according to claim 1 wherein the moveable platform comprise a satellite.

16. A satellite comprising:

a housing moveable in space with respect to earth; and a synthetic aperture radar (SAR) carried by said housing and comprising at least one antenna being directed through the ionosphere, a radar transmitter cooperating with said at least one antenna to propagate transmit pulses through the ionosphere, and subjecting the transmit pulses to a Faraday rotation based upon propagation through the ionosphere along a transmit path, a radar receiver cooperating with said at least one antenna to receive echo pulses through the ionosphere based upon the transmit pulses, and subjecting the echo pulses to a Faraday rotation based upon propagation through the ionosphere along a receive path, and a radar processor connected to said radar transmitter and radar receiver for processing to account for the Faraday rotation introduced by propagation through the ionosphere by estimating an individual ionospheric distortion for each received echo pulse based upon a measured Faraday rotation, and reducing the ionospheric distortion for each received echo pulse based upon the estimated individual ionospheric distortion associated therewith for providing a compensated echo pulse.

17. A satellite according to claim 16 wherein said radar transmitter adjusts transmission of at least one subsequent transmit pulse based upon the measured Faraday rotation.

18. A satellite according to claim 16 wherein said radar receiver adjusts processing of the echo pulse associated with the at least one subsequent transmit pulse based upon the measured Faraday rotation.

19. A satellite according to claim 16 wherein said radar processor accounts for the Faraday rotation on a per pulse basis.

20. A satellite according to claim 16 wherein said radar transmitter generates the transmit pulses so that each transmit pulse comprises a modulated signal having a predetermined bandwidth; and wherein said radar processor measures the Faraday rotation for a plurality of frequencies within the predetermined bandwidth for the echo pulse associated with at least one given transmit pulse.

21. A satellite according to claim 16 wherein said radar processor measures the Faraday rotation based upon cross-polarization and co-polarization measurements for the echo pulse associated with at least one given transmit pulse based upon the following polarimetric equation $$\frac{V_{HV}(f) - V_{VH}(f)}{V_{HH}(f) + V_{VV}(f)},$$

where $V_{HH}$ represents measurement of a co-polarized horizontal backscatter echo signal, $V_{VV}$ represents measurement of a co-polarized vertical backscatter echo signal, and $V_{VH}$ and $V_{HV}$ represent measurements of corresponding cross-polarized backscatter echo signals.

22. A satellite according to claim 21 wherein the polarimetric equation is equal to tan (2Ω(f)), and $$\Omega(f) = \alpha \frac{TEC}{f^2},$$

where Ω(f) is equal to the measured Faraday rotation at frequency f for the echo pulse associated with the at least one given transmit pulse, α is equal to a fixed constant, and TEC is a total electron content of the ionosphere for the echo pulse associated with the at least one given transmit pulse; and wherein said radar processor derives from Ω(f) at multiple frequencies an estimate of the TEC for the echo pulse associated with the at least one given transmit pulse for estimating the individual distortion thereof.

23. A satellite according to claim 22 wherein said radar transmitter generates the transmit pulses so that each transmit pulse comprises a modulated signal having a predetermined bandwidth; wherein said radar processor measures the Faraday rotation for a plurality of frequencies within the predetermined bandwidth for the echo pulse associated with the at least one given transmit pulse; and wherein said radar processor compensates for errors in the measured Faraday rotation, and therefore the estimated TEC, by determining a plurality of sine values for the plurality of measured Faraday rotations within the echo pulse;

determining a Fourier transform for the plurality of sine values; and selecting a peak value from the Fourier transform, with a position of the peak value corresponding to a corrected estimate of the TEC.

24. A satellite according to claim 22 wherein said radar transmitter generates the transmit pulses so that each transmit pulse comprises a modulated signal having a predetermined bandwidth; wherein said radar processor measures the Faraday rotation for a plurality of frequencies within the predetermined bandwidth for the echo pulse associated with the at least one given transmit pulse; and wherein said radar processor compensates for errors in the measured Faraday rotation by averaging the estimated TEC at multiple frequency pairings within the echo pulse.

25. A satellite according to claim 22 wherein if the measured Faraday rotation is less than or equal to 10 degrees, then a corrected estimate of the TEC is produced by taking the following average for a plurality of frequencies with the echo pulse:

$$\text{mean}_{all\ f}\left[\left(\frac{V_{HV}(f) - V_{VH}(f)}{V_{HH}(f) + V_{VV}(f)}\right)\frac{f^2}{2\alpha}\right] = TEC_{est}.$$

where $V_{HH}$ represents measurement of a co-polarized horizontal backscatter echo signal, $V_{VV}$ represents measurement of a co-polarized vertical backscatter echo signal, $V_{VH}$ and $V_{HV}$ represent measurements of corresponding cross-polarized backscatter echo signals, α is equal to a fixed constant, and TEC is a total electron content of the ionosphere for the echo pulse associated with the at least one given transmit pulse.

26. A satellite according to claim 16 wherein the ionosphere has a spatially varying total electron content (TEC) associated therewith; and wherein said radar processor derives from the measured Faraday rotation the TEC for the echo pulse associated with at least one given transmit pulse.

27. A satellite according to claim 16 wherein said radar transmitter and radar receiver operate in the VHF/UHF band.

28. A method for operating a synthetic aperture radar (SAR) for a moveable platform comprising:

directing at least one antenna through the ionosphere;

transmitting transmit pulses from a radar transmitter cooperating with the at least one antenna, and subjecting the transmit pulses to a Faraday rotation based upon propagation through the ionosphere along a transmit path;

receiving echo pulses associated with the transmit pulses by a radar receiver cooperating with the at least one antenna, and subjecting the echo pulses to a Faraday rotation based upon propagation through the ionosphere along a receive path; and processing to account for the Faraday rotation introduced by propagation through the ionosphere by estimating an individual ionospheric distortion for each received echo pulse based upon a measured Faraday rotation, and reducing the ionospheric distortion for each received echo pulse based upon the estimated individual ionospheric distortion associated therewith for providing a compensated echo pulse.

29. A method according to claim 28 further comprising adjusting transmission of at least one subsequent transmit pulse based upon the measured Faraday rotation.

30. A method according to claim 28 further comprising adjusting processing of the echo pulse associated with at least one subsequent transmit pulse based upon the measured Faraday rotation.

31. A method according to claim 28 wherein the processing accounts for the Faraday rotation on a per pulse basis.

32. A method according to claim 28 wherein the radar transmitter generates the transmit pulses so that each transmit pulse comprises a modulated signal having a predetermined bandwidth; and wherein measuring the Faraday rotation is based upon measuring the Faraday rotation for a plurality of frequencies within the predetermined bandwidth for the echo pulse associated with the at least one given transmit pulse.

33. A method according to claim 32 wherein the modulated signal comprises a linear frequency modulated chirp signal.

34. A method according to claim 32 further comprising compensating for errors in the measured Faraday rotation, and therefore the estimated TEC, by determining an average estimated TEC from multiple frequency pairings associated with the plurality of measured Faraday rotations.

35. A method according to claim 32 further comprising compensating for errors in the measured Faraday rotation by determining a plurality of sine values for the plurality of measured Faraday rotations;

determining a Fourier transform for the plurality of sine values; and selecting a peak value from the Fourier transform, the peak value corresponding to a corrected estimate of the TEC.

36. A method according to claim 28 wherein measuring the Faraday rotation is based upon cross-polarization and co-polarization measurements for the echo pulse associated with at least one given transmit pulse based upon the following polarimetric equation $$\frac{V_{HV}(f) - V_{VH}(f)}{V_{HH}(f) + V_{VV}(f)},$$

where $V_{HH}$ represents measurement of a co-polarized horizontal backscatter echo signal, $V_{VV}$ represents measurement of a co-polarized vertical backscatter echo signal, and $V_{VH}$ and $V_{HV}$ represent measurements of corresponding cross-polarized backscatter echo signals.

37. A method according to claim 36 wherein the polarimetric equation is equal to tan (2Ω(f)), and $$\Omega(f) = \alpha \frac{TEC}{f^2},$$

where Ω(f) is equal to the measured Faraday rotation at frequency f for the echo pulse associated with the at least one given transmit pulse, α is equal to a fixed constant, and TEC is a total electron content of the ionosphere for the echo pulse associated with the at least one given transmit pulse; and wherein the processing further comprises deriving from Ω(f) at multiple frequencies an estimate of the TEC for the echo pulse associated with the at least one given transmit pulse for estimating the individual ionospheric distortion thereof.

38. A method according to claim 37 wherein the radar transmitter generates the transmit pulses so that each transmit pulse comprises a modulated signal having a predetermined bandwidth; wherein the radar processor measures the Faraday rotation for a plurality of frequencies within the predetermined bandwidth for the echo pulse associated with the at least one given transmit pulse; and wherein the radar processor compensates for errors in the measured Faraday rotation, and therefore the estimated TEC, by determining a plurality of sine values for the plurality of measured Faraday rotations within the echo pulse;

determining a Fourier transform for the plurality of sine values; and selecting a peak value from the Fourier transform, with a position of the peak value corresponding to a corrected estimate of the TEC.

39. A method according to claim 37 wherein the radar transmitter generates the transmit pulses so that each transmit pulse comprises a modulated signal having a predetermined bandwidth; wherein the processing measures the Faraday rotation for a plurality of frequencies within the predetermined bandwidth for the echo pulse associated with the at least one given transmit pulse; and wherein the processing compensates for errors in the measured Faraday rotation by averaging the estimated TEC at multiple frequency pairings within the echo pulse.

40. A method according to claim 37 wherein if the measured Faraday rotation is less than or equal to 10 degrees, then a corrected estimate of the TEC is produced by taking the following average for a plurality of frequencies with the echo pulse:

$$\text{mean}_{all\ f}\left[\left(\frac{V_{HV}(f) - V_{VH}(f)}{V_{HH}(f) + V_{VV}(f)}\right)\frac{f^2}{2\alpha}\right] = TEC_{est}.$$

where $V_{HH}$ represents measurement of a co-polarized horizontal backscatter echo signal, $V_{VV}$ represents measurement of a co-polarized vertical backscatter echo signal, $V_{VH}$ and $V_{HV}$ represent measurements of corresponding cross-polarized backscatter echo signals, α is equal to a fixed constant, and TEC is a total electron content of the ionosphere for the echo pulse associated with the at least one given transmit pulse.

41. A method according to claim 28 wherein the ionosphere has a spatially varying total electron content (TEC) associated therewith; and wherein the processing further comprises deriving from the measured Faraday rotation the TEC for the echo pulse associated with at least one given transmit pulse.

42. A method according to claim 28 wherein the measured Faraday rotation for the transmit path is equal to the Faraday rotation for the receive path.

43. A method according to claim 28 wherein the radar transmitter and radar receiver operate in the VHF/UHF band.

44. A method according to claim 28 wherein the movable platform comprise a satellite.

* * * * *

UNITED STATES PATENT AND TRADEMARK OFFICE
CERTIFICATE OF CORRECTION

PATENT NO. : 6,914,553 B1
DATED : July 5, 2005
INVENTOR(S) : Edward R. Beadle et al.

It is certified that error appears in the above-identified patent and that said Letters Patent is hereby corrected as shown below:

Column 10,
Line 4, delete "SARS" insert -- SARs --.

Column 13,
Line 1, delete " $\Delta \tau_{ij} = \tau_i - \tau_j = \dfrac{80.6 TEC}{cf_t^2} - \dfrac{80.6 TEC}{cf_f^2}$ " insert -- $\Delta \tau_{ij} = \tau_i - \tau_j = \dfrac{80.6 TEC}{cf_i^2} - \dfrac{80.6 TEC}{cf_j^2}$ --.

Column 14,
Line 48, delete "image Formation" insert -- image. Formation --.

Column 18,
Line 24, delete "band Communication" insert -- band. Communication --.

Signed and Sealed this

Fifteenth Day of November, 2005

JON W. DUDAS
*Director of the United States Patent and Trademark Office*